US006026241A

United States Patent [19]

Chow et al.

[11] Patent Number: 6,026,241

[45] Date of Patent: Feb. 15, 2000

[54] SYSTEM, METHOD, AND COMPUTER PROGRAM PRODUCT FOR PARTIAL REDUNDANCY ELIMINATION BASED ON STATIC SINGLE ASSIGNMENT FORM DURING COMPILATION

[75] Inventors: Frederick Chow; Sun Chan, both of Fremont; Robert Kennedy, Boulder Creek; Shin-Ming Liu, Saratoga; Raymond Lo, Sunnyvale; Peng Tu, Union City, all of Calif.

[73] Assignee: Silicon Graphics, Inc., Mountain View, Calif.

[21] Appl. No.: 08/873,895

[22] Filed: Jun. 13, 1997

[51] Int. Cl.[7] .......... G06F 9/45

[52] U.S. Cl. .......... 395/709; 395/707; 395/708

[58] Field of Search .......... 395/705, 706, 395/707, 708, 709

[56] References Cited

U.S. PATENT DOCUMENTS

| | | | |
|---|---|---|---|
| 5,274,818 | 12/1993 | Vasilevsky et al. | 395/707 |
| 5,293,631 | 3/1994 | Rau et al. | 395/707 |
| 5,327,561 | 7/1994 | Choi et al. | 395/700 |
| 5,448,737 | 9/1995 | Burke et al. | 395/700 |
| 5,659,754 | 8/1997 | Grove et al. | 395/709 |
| 5,768,596 | 6/1998 | Chow et al. | 395/709 |
| 5,842,017 | 11/1998 | Hookway et al. | 395/707 |

OTHER PUBLICATIONS

Rosen et al., " Global Value Numbers and Redundant Computations" , Conference Record of the 15$^{th}$ ACM Symposium on the Principles of Programming Languages, Jan. 1988, pp. 12–27.

Briggs et al., " An Efficient Representation of Sparse Sets", ACM Letters on Programming Languages and Systems, vol. 2, nos. 1–4, Mar.–Dec. 1993, pp. 59–69.

Chakrabarti et al., " Global Communication Analysis and Optimization" , ACM, 1996, pp. 68–78.

Alpern et al., "Detecting Equality of Variables in Programs," *Conference Record of the 15th ACM Symposium on the Principles of Programming Languages*, Jan., 1988, pp. 1–11.

Chase et al., "Analysis of Pointers and Structures," *Proceedings of the SIGPLAN '90 Conference on Programming Language Design and Implementation*, Jun., 1990, pp. 296–310.

(List continued on next page.)

*Primary Examiner*—Tariq R. Hafiz
*Assistant Examiner*—Kakali Chaki
*Attorney, Agent, or Firm*—Sterne, Kessler, Goldstein & Fox P.L.L.C.

[57] ABSTRACT

Partial redundancy elimination of a computer program is described that operates using a static single assignment (SSA) representation of a computer program. The SSA representation of the computer program is processed to eliminate partially redundant expressions in the computer program. This processing involves inserting Φ functions for expressions where different values of the expressions reach common points in the computer program. A result of each of the Φ functions is stored in a hypothetical variable h. The processing also involves a renaming step where SSA versions are assigned to hypothetical variables h in the computer program, a down safety step of determining whether each Φ function in the computer program is down safe, and a will be available step of determining whether each expression in the computer program will be available at each Φ function following eventual insertion of code into the computer program for purposes of partial redundancy elimination. The processing also includes a finalize step of transforming the SSA representation of the computer program having hypothetical variables h to a SSA graph that includes some insertion information reflecting eventual insertions of code into the computer program for purposes of partial redundancy elimination, and a code motion step of updating the SSA graph based on the insertion information to introduce real temporary variables t for the hypothetical variables h.

21 Claims, 15 Drawing Sheets

OTHER PUBLICATIONS

Choi et al., "Efficient Flow–Sensitive Interprocedural Computation of Pointer–Induced Aliases and Side Effects," *Conference Record of the 20th ACM Symposium on the Principles of Programming Languages*, Jan., 1993, 232–245.

Chow et al., "Effective Representation of Aliases and Indirect Memory Operations in SSA Form," *Compiler Construction, 6th International Conference*, Apr., 1996, pp. 253–267.

Chow, F., "A Portable Machine–independent Global Optimizer—Design and Measurements," *Ph.D. Thesis and Technical Report 83–254. Computer System Lab. Stanford University*, Dec., 1983, pp. 1–172.

Click, C., "Global Code Motion Global Value Numbering," *Proceedings of the SIGPLAN '95 Conference on Programming Language Design and Implementation*, Jun., 1995, pp. 246–257.

Cocke et al., Programming Languages and Their Compilers, Courant Institute of Mathematical Sciences, New York University, Apr., 1970, pp. 320–334.

Cytron et al., "Efficient Accommodation of May–alias Information in SSA Form," *Proceedings of the SIGPLAN '93 Conference on Programming Language Design and Implementation*, Jun., 1993, pp. 36–45.

Rosen et al., "Global Value Numbers and Redundant Computation," *Conference Record of the 15th ACM Symposium on the Principles of Programming Languages*, Jan., 1988, pp. 12–27.

Ruf, "Context–Insensitive Alias Analysis Reconsidered," *Proceedings of the SIGPLAN '95 Conference on Programming Language Design and Implementation*, Jun., 1995, pp. 13–22.

Steensgaard, "Sparse Functional Stores for Imperative Programs," *Proceedings of the SIGPLAN '95 Workshop on Intermediate Representations*, Jan., 1995, pp. 62–70.

Wegman et al., "Constant Propagation with Conditional Branches," *ACM Transactions on Programming Languages and Systems*, vol. 13, No. 2, Apr., 1991, pp. 181–210.

Wilson et al., "Efficient Context Sensitive Pointer Analysis for C Programs," *Proceedings of the SIGPLAN '95 Conference on Programming Language Design and Implementation*, Jun., 1995, pp. 1–12.

Wolfe, "Beyond Induction Variables," *Proceedings of the SIGPLAN '92 Conference on Programming Language Design and Implementation*, Jun., 1992, pp. 162–174.

Choi et al., "On the Efficient Engineering of Ambitious Program Analysis," *IEEE Transactions on Software Engineering*, vol. 20, No. 2, Feb., 1994, pp. 105–114.

Cytron et al., "Efficiently Computing Static Single Asignment Form and the Control Dependence Graph," *ACM Transactions on Programming Languages and Systems*, vol. 13, No. 4, Oct., 1991, pp. 451–490.

Stoltz et al., "Extended SSA with Factored Use–Def Chains to Support Optimization and Parallelism," *Proceedings of the 27th Annual Hawaii International Conference on System Sciences*, 1994, pp. 43–52.

P. Briggs and K. Cooper, "Effective Partial Redundancy Elimination", *Proceedings of the ACM SIGPLAN '94 Conference on Programming language Design and Implementation*, pp. 159–170, Jun. 1994.

J. Choi, R. Cytron, and J. Ferrante, "Automatic Construction of Sparse Data Flow Evaluation Graphs", *Conference Record of the Eighteenth ACM Symposium on Principles of Programming Languages*, pp. 55–66, Jan. 1991.

F. Chow et al., "Engineering a RISC Compiler System", *Proceedings of IEEE COMPCON*, pp. 132–137, Mar. 1986.

F. Chow, "Minimizing Register Usage Penalty At Procedure Calls", *Proceedings of the ACM SIGPLAN '88 Conference on Programming Language Design and Implementation*, pp. 85–94, Jun. 1988.

K. Cooper and T. Simpson, "Scc–Based Value Numbering", Technical Report CRPC–TR95636–S, Dept. of Computer Science, Rice University, Oct. 1995.

K. Cooper and T. Simpson, "Value–driven Code Motion", Technical Report CRPC–TR95637–S, Dept. of Computer Science, Rice University, Oct. 1995.

Choi, J. et al., "Incremental Computation of Static Single Assignment Form", *Proceedings of the Sixth International Conference on Compiler Construction*, pp. 223–237, Apr. 1996.

Dhamdhere, D. et al., "A New Algorithm for Composite Hoisting and Strength Reduction Optimization (+ corrigendum)", *Journal of Computer Mathematics*, 27:1–14(+ 31–32), 1989.

Dhamdhere, D. et al., "How to Analyze Large Programs Efficiently and Informatively", *Proceedings of the ACM SIGPLAN '92 Conference on Programming Language Design and Implementation*, pp. 212–223, Jun. 1992.

K. Dreschler and M. Stadel, "A Variation of Knoop, Rüthing and Steffen's Lazy Code Motion", *SIGPLAN Notices*, 28(5):29–38, May 1993.

Gerlek, M. et al., "Beyond Induction Variables: Detecting and Classifying Sequences Using a Demand–Driven SSA Form", *ACM Trans. On Programming Language and Systems*, 17(1):85–122, Jan. 1995.

Gerlek, M. et al., "A Reference Chain Approach for Live Variables", Technical Report CSE 94–029, Oregon Graduate Institute, Apr. 1994.

Johnson, R., "Efficient Program Analysis Using Dependence Flow Graphs", Technical Report (PhD Thesis), Dept. of Computer Science, Cornell University, Aug. 1994.

Johnson, r. et al., "The Program Structure Tree: Computing Control Regions in Linear Time", *Proceedings of the ACM SIGPLAN '94 Conference on Programming Language Design and Implementation*, pp. 171–185, Jun. 1994.

Knoop, J. et al., "Lazy Code Motion", *Proceedings of the ACM SIGPLAN '92 Conference on Programming Language Design and Implementation*, pp. 224–234, Jun. 1992.

Knoop, J. et al., "Lazy Strength Reduction", *Journal of Programming Languages*, 1(1):71–91, Mar. 1993.

Knoop, J. et al., "Optimal Code Motion: Theory and Practice", *ACM Trans. on Programming Languages and Systems*, 16(4):1117–1155, Oct. 1994.

Knoop, J. et al., "Partial Dead Code Elimination", *Proceedings of the ACM SIGPLAN '94 Conference on Programming Language Design and Implementation*, pp. 147–158, Jun. 1994.

Liu, S. et al., "Loop Induction Variable Canonicalization in Parallelizing Compilers", *Proceedings of the Fourth International Conference on parallel Architectures and Compilation Techniques*, pp. 228–237, Oct. 1996.

E. Morel and C. Renvoise, "Global Optimization by Suppression of Partial Redundancies", *Comm. ACM*, 22(2):96–103, Feb. 1979.

V. Sreedhar and G. Gao, "A Linear Time Algorithm for Placing ø–nodes", *Conference Record of the Eighteenth ACM Symposium on Principles of Programming Languages*, pp. 62–73, Jan. 1995.

Schwarz, B. et al., "An Optimizer for Ada– Design, Experiences and Results", *Proceedings of the ACM SIGPLAN '88 Conference on Programming Language Design and Implementation*, pp. 175–184, Jun. 1988.

Chow, F. et al., "A New Algorithm for Partial Redundancy Elimination based on SSA Form", *ACM*, 1997, pp. 273–286.

SYSTEM, METHOD, AND COMPUTER PROGRAM PRODUCT FOR PARTIAL REDUNDANCY ELIMINATION BASED ON STATIC SINGLE ASSIGNMENT FORM DURING COMPILATION

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

1. Field of the Invention

This invention generally relates to computer software compilers, and more particularly to optimizers in computer software compilers that perform an opimization called partial redundancy elimination (PRE).

2. Related Art

The Static Single Assignment Form (SSA) has become a popular program representation in optimizing compilers, because it provides accurate use-definition (use-def) relationships among the program variables in a concise form. Before proceeding further, it may be useful to briefly describe SSA.

In SSA form, each definition of a variable is given a unique version, and different versions of the same variable can be regarded as different program variables. Each use of a variable version can only refer to a single reaching definition. When several definitions of a variable, $a_1, a_2, \ldots, a_m$, reach a common node (called a merging node) in the control flow graph of the program, a $\phi$ function assignment statement, $a_n=\phi(a_1, a_2, \ldots, a_m)$, is inserted to merge the variables into the definition of a new variable version $a_n$. Thus, the semantics of single reaching definitions are maintained.

Many efficient global optimization algorithms have been developed based on SSA. Among these optimizations are dead store elimination, constant propagation, value numbering, induction variable analysis, live range computation, and global code motion. However, all these uses of SSA have been restricted to solving problems based on program variables, since the concept of use-def does not readily apply to expressions. Noticeably missing among SSA-based optimizations is partial redundancy elimination.

Partial redundancy elimination (PRE) is a powerful optimization algorithm. PRE was first described in E. Morel and C. Renvoise, "Global optimization by suppression of partial redundancies," *Comm ACM,* 22(2):96–103, February 1979. PRE targets partially redundant computations in a program, and removes global common subexpressions and moves invariant computations out of loops. PRE has since become the most important component in many global optimizers.

PRE shall now be generally described with reference to FIGS. 10A and 10B. FIG. 10A illustrates a program control flow graph having basic blocks 1002, 1004, 1006. Basic blocks 1004 and 1006 contain an expression a+b. There are two paths through this control flow graph: basic block 1002 to basic block 1006, and basic block 1004 to basic block 1006. When the path from basic block 1102 to basic block 1006 is taken, the expression a+b is performed only once. However, when the path from basic block 1004 to basic block 1006 is taken, the expression a+b is redundantly performed twice. Accordingly, the scenario shown in FIG. 10A is an example of partial redundancy of the expression a+b.

For performance purposes, it would be desirable to eliminate the expression a+b in basic block 1006, since its performance in basic block 1006 is redundant to its performance in basic block 1004. However, the expression a+b is not performed in basic block 1002. Accordingly, without additional modification, the expression a+b cannot be eliminated from basic block 1006.

PRE works as shown in FIG. 10B. According to PRE, the results of expression a+b is stored in a variable t in basic block 1004. This expression from basic block 1004 is inserted in basic block 1002, thereby making the expression fully redundant. Then, the expression a+b is eliminated from basic block 1006, and all references to it are replaced by the variable t.

Knoop et al. formulated an alternative placement strategy called lazy code motion that improves on Morel and Renvoise's results by avoiding unnecessary code movements, and by removing the bidirectional nature of the original PRE data flow equations. The result of lazy code motion is optima: the number of computations cannot be further reduced by safe code motion, and the lifetimes of the temporaries introduced are minimized. See J. Knoop, O. R üthing, and B. Steffen, "Lazy code motion," *Proceedings of the ACM SIGPLAN '92 Conference on Programming Language Design and Implementation,* pages 224–234, June 1992; J. Knoop, O. Rüthing, and B. Steffen, "Optimal code motion: Theory and practice," *ACM Trans. on Programming Languages and Systems* 16(4):1117–1155, October 1994.

Drechsler and Stadel gave a simpler version of the lazy code motion algorithm that inserts computations on edges rather than in nodes. See K. Drechsler and M. Stadel, "A variation of Knoop, Rüthing and Steffen's lazy code motion," *SIGPLAN Notices,* 28(5):29–38, May 1993. It should be noted that the above published algorithms do not utilize SSA.

Optimizations based on SSA all share the common characteristic that they do not require traditional iterative data flow analysis in their solutions. They all take advantage of the sparse representation of SSA.

In a sparse form, information associated with an object is represented only at places where it changes, or when the object actually occurs in the program. Because it does not replicate information over the entire program, a sparse representation conserves memory space. Information can be propagated through the sparse representation in a smaller number of steps, speeding up most algorithms.

To get the full benefit of sparseness, one must typically give up operating on all elements in the program in parallel, as in traditional bit-vector-based data flow analysis. But operating on each element separately allows optimization decisions to be customized for each object.

There is another advantage of using SSA to perform global optimization. Traditional non-SSA optimization techniques often implement two separate versions of the same optimization: a global version that uses bit vectors in each basic block, and a simpler and faster local version that performs the same optimization within a basic block. SSA-based optimization algorithms do not need to distinguish between global and local optimizations. The same algorithm can handle both global and local versions of an optimization simultaneously. The amount of effort required to implement each optimization can be correspondingly reduced.

Prior to the present invention, a PRE algorithm based on SSA did not exist. As was hinted in D. Dhamdhere, B.

Rosen, and K. Zadeck, "How to analyze large programs efficiently and informatively," *Proceedings of the ACM SIGPLAN '92 Conference on Programming Language Design and Implementation,* pages 212–223, June 1992, any attempt at developing a PRE algorithm based on SSA is difficult because an expression E can be redundant as the result of many different computations at different places of the same expression E', E", . . . whose operands have different SSA versions from the operands of E. This is illustrated in FIG. 3A, where the expression E is generally represented by a+b.

In such a situation, the use-def chain of SSA does little to help in recognizing that E is partially redundant (see basic blocks 302 and 308). It also does not help in effecting the movement of computations. Lacking an SSA-based PRE algorithm, optimizers that use SSA have to switch to bit-vector algorithms in performing PRE. To apply subsequent SSA-based optimizations, it is necessary to convert the results of PRE back into SSA form, and such incremental updates based on arbitrary modifications to the program are expensive.

Accordingly, what is required is a compiler that performs partial redundancy elimination (PRE) using the SSA form.

Before proceeding further, it may be useful to consider work aimed at improving the efficiency of data flow analysis and PRE.

By generalizing SSA form, Choi et al. derived Sparse Evaluation Graphs as reduced forms of the original flow graph for monotone data flow problems related to variables. The technique must construct a separate sparse graph per variable for each data flow problem, before solving the data flow problem for the variable based on the sparse graph. Thus, it cannot practically be applied to PRE, which requires the solution of several different data flow problems. See J. Choi, R. Cytron, and J. Ferrante, "Automatic construction of sparse data flow evaluation graphs," *Conference Record of the Eighteenth ACW Symposium on Principles of Programming Languages,* pages 55–66, January 1991.

Dhamdhere et al. observed that in solving for a monotone data flow problem, it suffices to examine only the places in the problem where the answer might be different from the trivial default answer ⊥. There are only three possible transfer functions for a node: raise to ⊤, lower to ⊥, or identity (propagate unchanged). They proposed slotwise analysis. For nodes with the identity transfer function, those that are reached by any node whose answer is ⊥ will have ⊥ as their answer. By performing the propagation slotwise, the method can arrive at the solution for each variable in one pass over the control flow graph. Slotwise analysis is not sparse, because it still performs the propagation with respect to the control flow graph of the program. The approach can be used in place of the iterative solution of a monotone data flow problem as formulated. It can be used to speed up the data flow analyses in PRE. See D. Dhamdhere, B. Rosen, and K. Zadeck, "How to analyze large programs efficiently and informatively," *Proceedings of the ACM SIGPLAN '92 Conference on Programming Language Design and Implementation,* pages 212–223, June 1992.

Johnson proposed the use of Dependence Flow Graphs (DFG) as a sparse approach to speed up data flow analysis. The DFG of a variable can be viewed as its SSA graph with additional "merge" operators imposed to identify single-entry single-exit (SESE) regions for the variable. By identifying SESE regions with the identity transfer function, the technique can short-circuit propagation through them. Johnson showed how to apply his techniques to the data flow systems in Drechsler and Stadel's variation of Knoop et al.'s lazy code motion. See R. Johnson, "Efficient program analysis using dependence flow graphs," Technical Report (PhD Thesis), Dept. of Computer Science, Cornell University, August 1994.

Researches at Rice University have done worked aimed at improving the effectiveness of PRE. The work involves the application of some SSA-based transformation techniques to prepare the program for optimization by PRE. Their techniques enhance the results of PRE. Their implementation of PRE was based on Drechsler and Stadel's variation of Knoop et al.'s lazy code motion, and was unrelated to SSA. See P. Briggs and K. Cooper, "Effective partial redundancy elimination," *Proceedings of the ACM SIGPLAN '94 Conference on Programming Language Design and Implementation,* pages 159–170, June 1994; and K. Cooper and T. Simpson, "Value-driven code motion," Technical Report CRPC-TR95637-S, Dept. of Computer Science, Rice University, October 1995.

All prior work related to PRE (including those described above) has modeled the problem as systems of data flow equations. Regardless of how efficiently the systems of data flow equations can be solved, a substantial amount of time needs to be spent in scanning the contents of each basic block in the program to initialize the local data flow attributes that serve as input to the data flow equations. Experience has shown that this often takes more time than the solution of the data flow equations, so a fundamentally new approach to PRE that does not require the dense initialization of data flow information is highly desirable. A PRE algorithm based on SSA would solve this problem, since SSA is sparse. However, prior to the present invention, a PRE algorithm based on SSA did not exist.

SUMMARY OF THE INVENTION

The present invention is directed to a system, method, and computer program product that performs PRE directly on an SSA representation of the computer program. The approach of the invention is called Static Single Assignment Partial Redundancy Elimination (SSAPRE).

SSAPRE is sparse because it does not require collecting traditional local data flow attributes over the program and it does not require any form of iterative data flow analysis to arrive at its solution. SSAPRE works by constructing the SSA form of a hypothetical temporary h that could be used to store the result of each computation (expression) in the program. In the resulting SSA form of h, a def (definition) corresponds to a computation whose result may need to be saved, and a use corresponds to a redundant computation that may be replaced by a load of h.

Based on this SSA form of h, SSAPRE then applies the analyses corresponding to PRE. The analyses allow the identification of additional defs of h, with accompanying computations, that need to be inserted to achieve optimal code motion. The final output is generated according to the updated SSA graph of h: temporaries t are introduced into the program to save and reuse the values of computations.

Since the algorithm works by modeling the SSA forms of the hypothetical temporaries h, the real temporaries t introduced are maintained with SSA properties. The results of the SSAPRE approach of the present invention are shown in the example of FIG. 3B (corresponding to FIG. 3A).

More particularly, the present invention is directed to a system, method, and computer program product for performing PRE optimization of a computer program. The invention operates using a static single assignment (SSA)

representation of a computer program. The invention processes the SSA representation of the computer program to eliminate partially redundant expressions in the computer program.

This processing of the invention involves inserting Φ functions for expressions where different values of the expressions reach common points in the computer program. A result of each of the Φ functions is stored in a hypothetical variable h. The invention also performs a renaming step where SSA versions are assigned to hypothetical variables h in the computer program. In an embodiment of the invention, the renaming step involves a delayed renaming approach.

The invention further performs a down safety step of determining whether each Φ function in the computer program is down safe, and a will be available step of determining whether each expression in the computer program will be available at each Φ function following eventual insertion of code into the computer program for purposes of partial redundancy elimination.

The invention additionally performs a finalize step of transforming the SSA representation of the computer program having hypothetical variables h to a SSA graph that includes some insertion information reflecting eventual insertions of code into the computer program for purposes of partial redundancy elimination, and a code motion step of updating the SSA graph based on the insertion information to introduce real temporary variables t for the hypothetical variables h.

The invention optionally performs a collect-occurrences step of scanning the SSA representation of the computer program to create a work list of expressions in the computer program that need to be considered during optimization.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE FIGURES

The present invention will be described with reference to the accompanying drawings, wherein.

DETAILED DESCRIPTION OF THE PREFERRED EMBODIMENTS

1.0 Overview of the Invention

Figure 1:
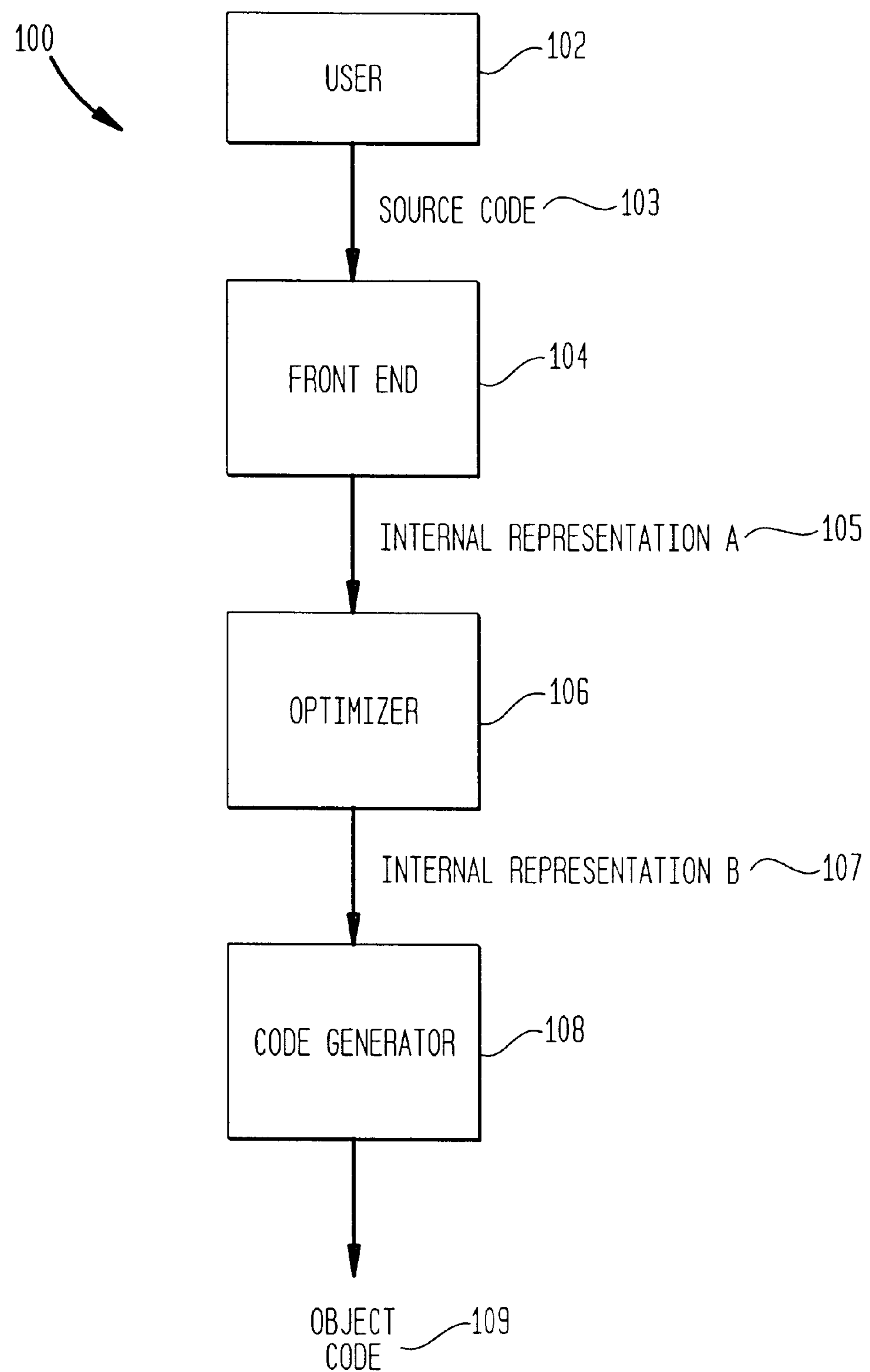
FIG. 1 is a block diagram and a data flow diagram of a compiler according to an embodiment of the invention.

The present invention is directed to a computer software compiler 100. FIG. 1 illustrates the components of a compiler 100, and the flow of data between the compiler components. The components of a compiler 100 include: a front end 104, optimizer 106, and code generator 108.

In operation, a user 102 submits source code 103 to the compiler 100. The front end 104 component of the compiler 100 receives the source code 103 and produces a first internal representation, called internal representation A 105 for convenience purpose only. The optimizer 106 inputs and analyzes the internal representation A 105. Based on its analysis, the optimizer 106 restructures and otherwise modifies portions of the internal representation A 105, thereby making it more efficient code. The resulting efficient code is called internal representation B 107 for convenience purpose only.

The code generator 108 inputs the internal representation B 107 and generates object code 109. The object code 109 is then available to the user to link and load, thereby creating an executable image of the source code 103 for running on a computer system.

Compiler technology is described in a number of publicly available documents, such as Aho et al., *Compilers: Principles, Techniques, and Tools, Addison Wesley,* 1986, which is herein incorporated by reference in its entirety.

A preferred embodiment of the present invention is directed to the optimizer 106. The SSAPRE approach of the invention is performed by the optimizer 106.

2.0 Host System of the Preferred Embodiment

Figure 2:
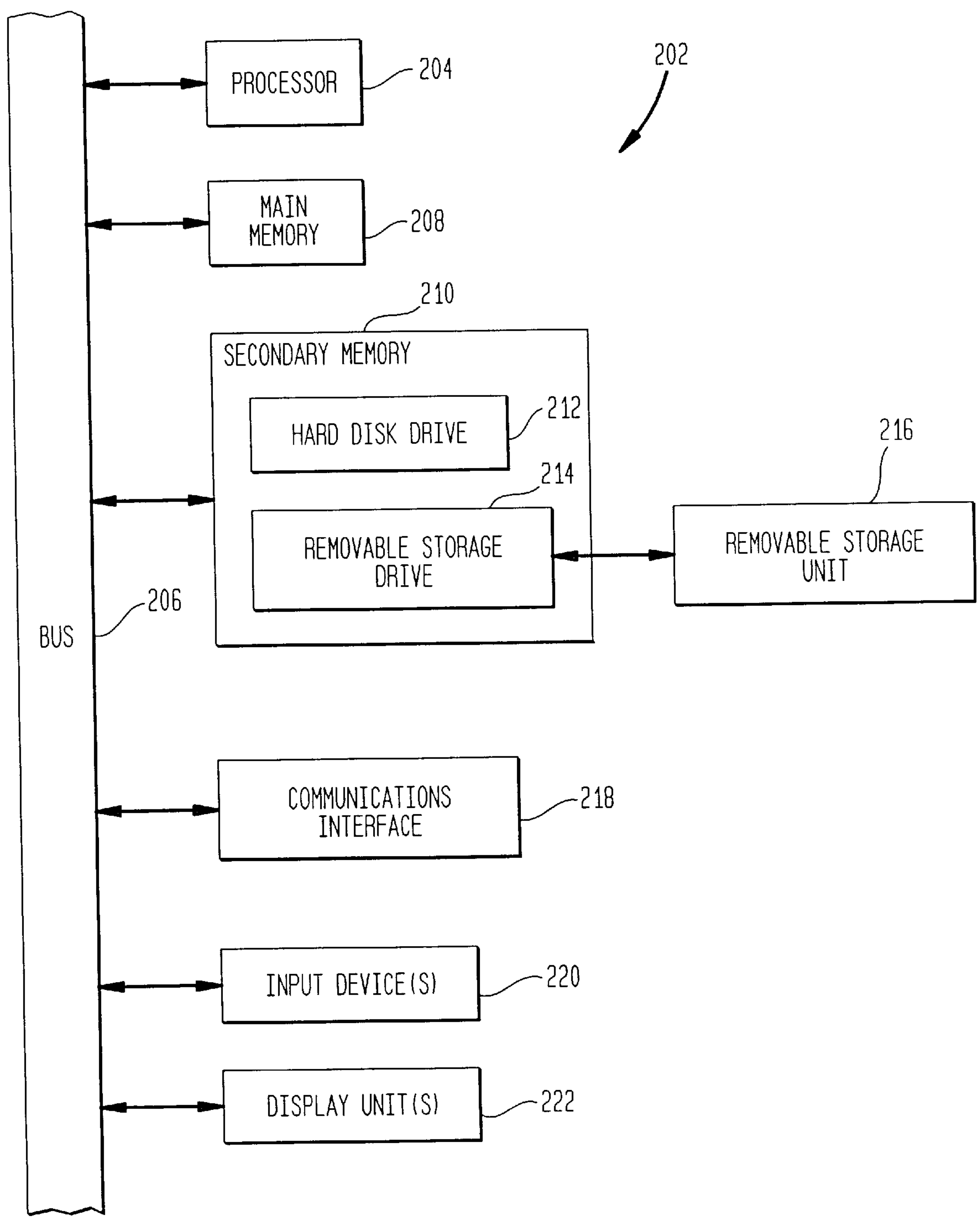
FIG. 2 is a block diagram illustrating an exemplary computer system useful for implementing components of the invention.
Figure 3A:
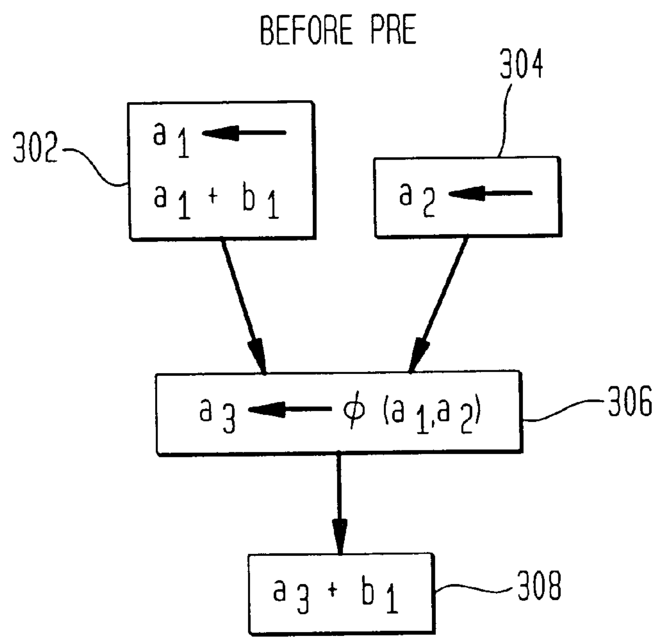
FIG. 3A is used to describe partial redundancy elimination.
Figure 3B:
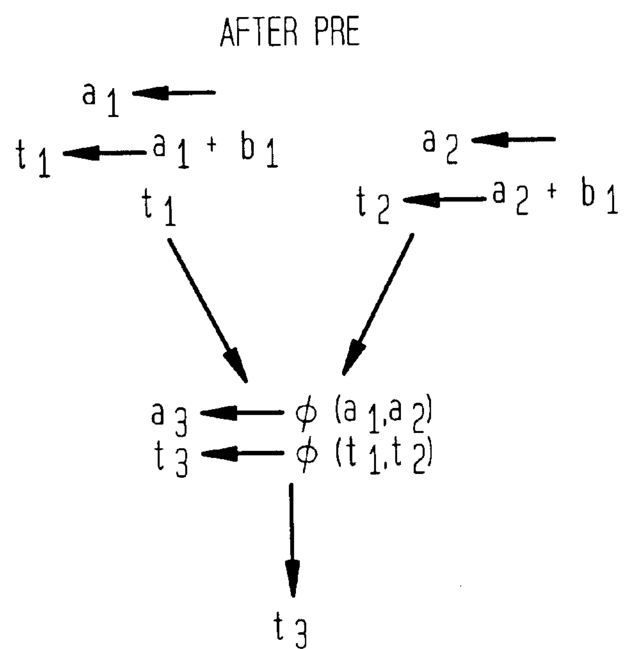
FIG. 3B illustrates the results of the SSAPRE approach of the present invention.

An embodiment of the present invention is computer software executing within a computer system. FIG. 2 shows an exemplary computer system 202. The compiler 100 of the present invention may execute in the computer system 202. Also, code generated by the compiler 100 may execute in the computer system 202.

The computer system 202 includes one or more processors, such as a processor 204. The processor 204 is connected to a communication bus 206.

The computer system 202 also includes a main memory 208, preferably random access memory (RAM), and a secondary memory 210. The secondary memory 210 includes, for example, a hard disk drive 212 and/or a removable storage drive 214, representing a floppy disk drive, a magnetic tape drive, a compact disk drive, a compact disk drive, an optical drive, a ZIP drive, a JAZZ drive, etc. The removable storage drive 214 reads from and writes to a removable storage unit 216.

Removable storage unit 216, also called a program storage device or a computer program product, represents a floppy disk, magnetic tape, compact disk, ZIP disk, JAZZ disk, optical disk, etc. As will be appreciated, the removable storage unit 216 includes a computer usable storage medium having stored therein computer software and/or data. The removable storage drive 214 reads from and/or writes to the removable storage unit 116 in a well known manner.

The computer system 202 may also include a communications interface 218, such as a network card, and one or more input devices (such as a keyboard, mouse, trackball, etc.). The computer system 202 also includes one or more display units 222.

In an embodiment where the invention is implemented using software, the software (also called control logic) may be stored in main memory 208, in secondary memory 210, and/or in a removable storage unit 216. The software, when executed by the processor 204, causes the processor 204 to perform the functions of the invention as described herein.

In another embodiment, the invention is implemented primarily in hardware using, for example, a hardware state machine. Implementation of the hardware state machine so as to perform the functions described herein will be apparent to persons skilled in the relevant arts.

The preferred embodiment of the present invention is directed to execute on a computer system 202 in which the processor 204 is any processor, including but not limited to a MIPS, Intel, AMD, Digital, etc., processor. The preferred embodiment of the present invention is implemented in software, and more specifically, is written in the programming language C++. The preferred embodiment is described in these terms for convenience purpose only. The invention is not limited to these specific embodiments. Other computer systems 202, other processors 204, and other programming languages capable of performing the functions described herein could alternatively be used.

3.0 Overview of the SSAPRE Approach

The input to SSAPRE is an SSA representation of the program (i.e., source code 103). In SSA, each definition of a variable is given a unique version, and different versions of the same variable can be regarded as different program variables. Each use of a variable version can only refer to a single reaching definition. By virtue of the versioning, use-def information is built into the representation. Where several definitions of a variable, $a_1, a_2, \ldots, a_m$, reach a confluence point (also called a merging node, or a confluence node) in the control flow graph of the program, a $\phi$ function assignment statement, $a_n \leftarrow \phi(a_1, a_2, \ldots, a_m)$, is inserted to merge them into the definition of a new variable version $a_n$ Thus the semantics of single reaching definitions are maintained. This introduction of a new variable version as the result of $\phi$ factors the set of use-def edges over confluence nodes, reducing the number of use-def edges required to represent the program. In SSA, the use-def chain for each variable can be provided by making each version point to its single definition. One important property of SSA form is that each definition must dominate all its uses in the control flow graph of the program if the uses at $\phi$ operands are regarded as occurring at the predecessor nodes of their corresponding edges.

It is assumed that all expression are represented as trees with leaves that are either constants or SSA-renamed variables. SSAPRE can be applied to program expressions independently, regardless of subexpression relationships. In Section 6, below, there is described a strategy according to the invention that exploits the nesting relationship in expression trees to obtain greater optimization efficiency under SSAPRE. Indirect loads are also candidates for SSAPRE, but since they reference memory and can have aliases, the indirect variables have to be in SSA form in order for SSAPRE to handle them.

In an embodiment of the invention, the optimizer 106 processes a computer program in a HSSA (Hashed SSA) form. The HSSA form represents a uniform SSA representation of all the scalar and indirect memory operations of the program based on global value. Use of the HSSA form allows SSAPRE to uniformly handle indirect loads together with other expressions in the program. The HSSA form is described in pending U.S. application Ser. No. 08/636,605 filed Apr. 23, 1996, now U.S. Pat. No. 5,768,596, titled "A System and Method to Efficiently Represent Aliases and Indirect Memory Operations in Static Single Assignment Form During Compilation," incorporated by reference herein in its entirety. The HSSA form is also described in F. Chow, S. Chan, S. Liu, R. Lo, and M. Streich, "Effective representation of aliases and indirect memory operations in SSA form," *Proceedings of the Sixth International Conference on Compiler Construction,* pages 253–267, April 1996, incorporated by reference herein in its entirety. In an alternate embodiment, the optimizer 106 processes a computer program in SSA form.

Figure 9:
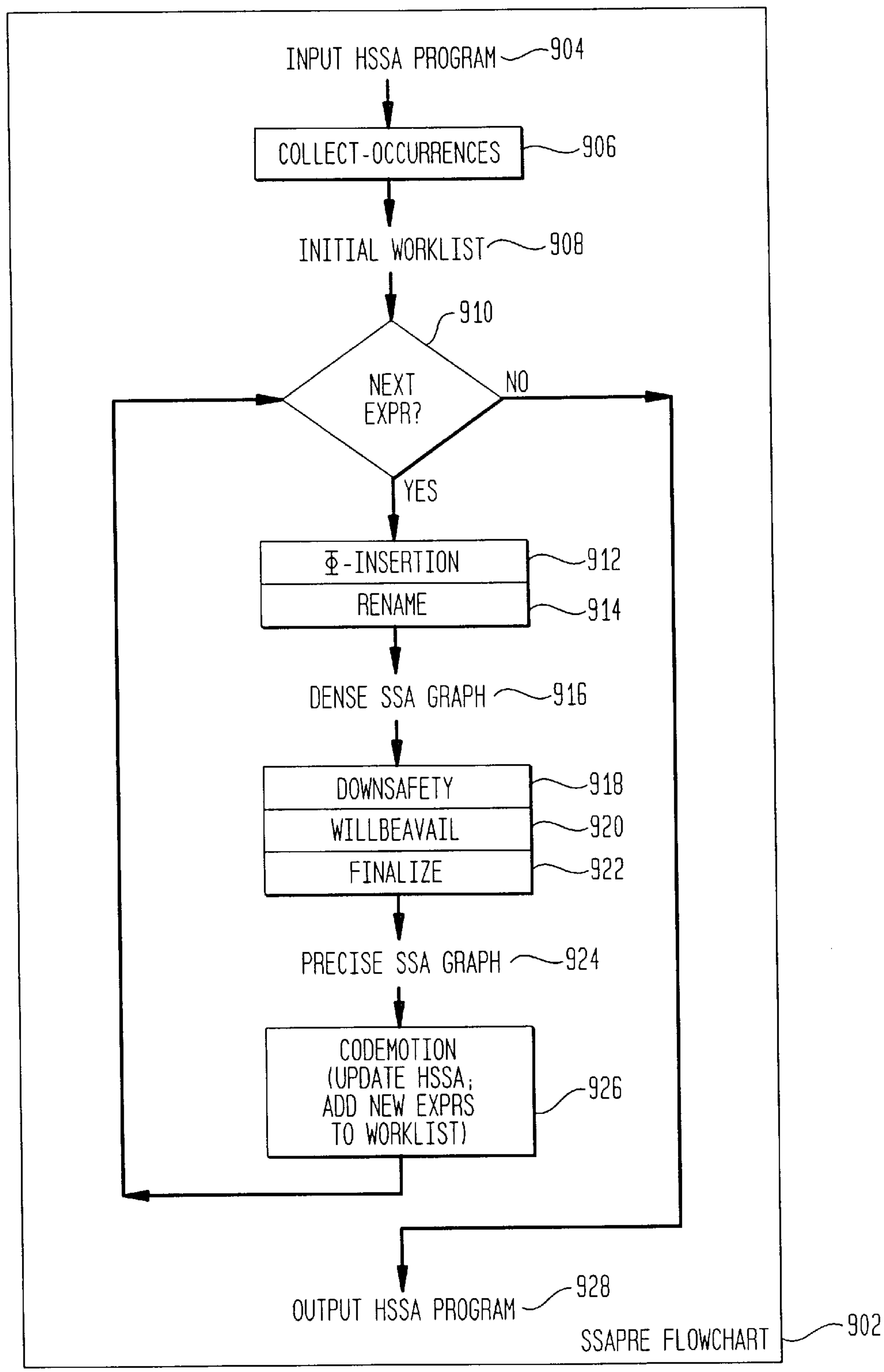
FIG. 9 is a flowchart representing the operation of an optimizer according to an embodiment of the invention.
Figure 10A:
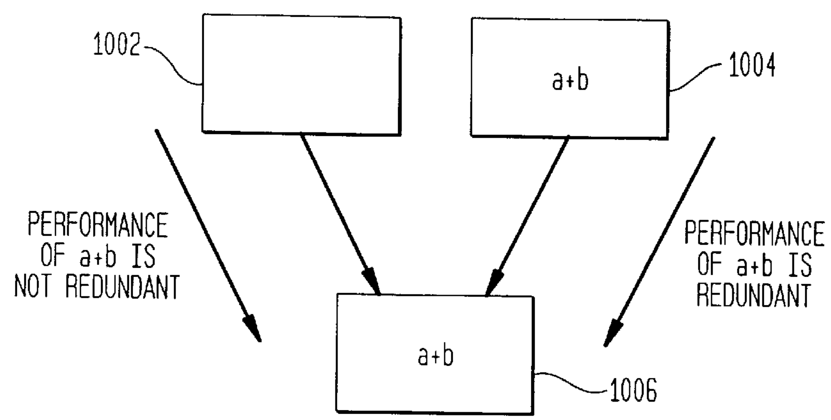
FIGS. 10A and 10B are used to further describe partial redundancy elimination.
Figure 10B:
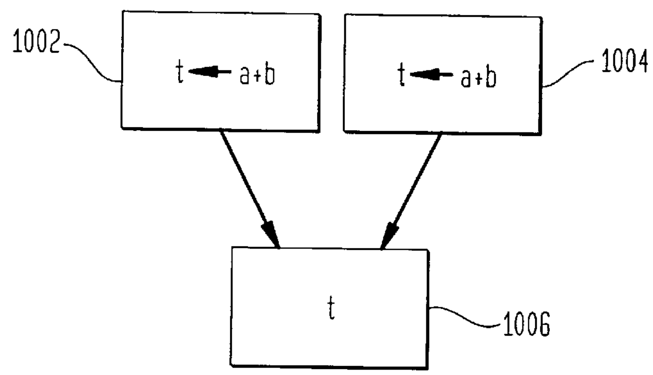

FIG. 9 illustrates a flowchart 902 representing the operation of the optimizer 106 when performing SSAPRE. The performance of SSAPRE includes six steps: (1) Φ-Insertion (step 912), (2) Rename (step 914), (3) DownSafety (step 918), (4) WillBeAvail (step 920), (5) Finalize (922), and (6) CodeMotion (step 926). Some embodiments also include the performance of a Collect-Occurrences function (step 906).

SSAPRE works by conducting a round of SSA construction on the lexically identical expressions in the program whose variables are already in SSA form. Expressions are lexically identical if they apply exactly the same operator to exactly the same operands; the SSA versions of the variables are ignored in matching expressions. For example, $a_1+b_1$ and $a_2+b_2$ are lexically identical expressions.

Since the term SSA cannot be meaningfully applied to expressions, SSAPRE defines it to refer to the hypothetical temporary h that could be used to store the result of the expression. The symbol Φ is used herein to refer to an expression or function assignment statement. This is in contrast to the symbol $\phi$, which is used to refer to a variable assignment statement.

The Φ-Insertion step 912 and the Rename step 914 are the initial SSA construction steps for expressions. This round of SSA construction can use an approach that works on all expressions in the program simultaneously. Such an approach is generally described in R. Cytron, J. Ferrante, B. K. Rosen, M. N. Wegman, and F. K. Zadeck, "Efficiently computing static single assignment form and the control dependence graph," *ACM Trans. on Programming Languages and Systems,* 13(4):451–490, October 1991, which is herein incorporated by reference in its entirety. Alternatively, an implementation may choose to work on each lexically identical expression in sequence. Such an approach, which is a sparse implementation, is described in Section 6.

Assume that we are working on the expression a+b, whose hypothetical temporary is h. After the Rename step 914, occurrences of a+b corresponding to the same version of h must compute to the same value. At this stage, the points of defs and uses of h have not yet been identified. Many Φ's inserted for h are also unnecessary. Later steps in SSAPRE correct this. Some Φ operands can be determined to be undefined (⊥) after the Rename step 914 because there is no available computation of a+b. These ⊥-valued Φ operands play a key role in the later steps of SSAPRE, because insertions are performed only because of them. We call the SSA graph 916 for h after the Rename step 914 a dense SSA graph because it contains more Φ's than in the minimal SSA form, which is defined in R. Cytron, J. Ferrante, B. K. Rosen, M. N. Wegman, and F. K. Zadeck, "Efficiently computing static single assignment form and the control dependence graph," *ACM Trans. on Programming Languages and Systems,* 13(4):451–490, October 1991.

The sparse computation of global data flow attributes for a+b can be performed on the dense SSA graph for h. Two separate phases are involved. The first phase, the DownSafety step 918, performs backward propagation to determine the Φ's whose results are not fully anticipated with respect to a+b. The second phase is the WillBeAvail step 920, which performs forward propagation to determine the Φ's where the computation of a+b will be available assuming PRE insertions have been performed at the appropriate incoming edges of the Φ's.

Using the results of the WillBeAvail step 920, the optimizer 106 is ready to finalize the effects of PRE. The Finalize step 922 inserts computation of a+b at the incoming edges of Φ to ensure that the computation is available at the merge point. For each occurrence of a+b in the program, it determines if it is a def or use of h. It also links the uses of h to their defs to form its precise SSA graph. Extraneous Φ's are removed so that h is in minimal SSA form.

The last step is to update the program to effect the code motion for a+b as determined by SSAPRE. The CodeMotion step 926 introduces the real temporary t to eliminate the redundant computations of a+b. It walks over the precise SSA graph of h and generates saves of the computation a+b into t, giving each t its unique SSA version. Redundant computations of a+b are replaced by t. The Φ's for h are translated into ϕ's for t in the native program representation.

The SSAPRE algorithm performed by the optimizer 106 is described in greater detail below.

4.0 Operation of the SSAPRE Approach

In this section, the SSAPRE algorithm performed by the optimizer 106 is described. In an embodiment, it is assumed that all critical edges in the control flow graph have been removed by inserting empty basic blocks at such edges. See J. Knoop, O. Rüthing, and B. Steffen, "Lazy code motion," *Proceedings of the ACM SIGPLAN '92 Conference on Programming Language Design and Implementation,* pages 224–234, June 1992; and K. Drechsler and M. Stadel, "A variation of Knoop, Rüthing and Steffen's lazy code motion," *SIGPLAN Notices,* 28(5):29–38, May 1993, which are herein incorporated by reference in their entireties. This allows insertions to be modeled as edge placements, even though insertions are only done at the ends of the predecessor blocks.

It is also assumed that the dominator tree (DT) and dominance frontiers (DF's) with respect to the control flow graph of the program being compiled have been previously computed. These data must have already been computed and used when the program was first put into SSA form.

It will be useful at this point to briefly describe dominance, dominator trees, and dominance frontiers, which are all well known concepts.

A basic block d of a control flow graph dominates basic block n, written d dom n, if every path from the initial basic block of the control flow graph to n goes through d. Under this definition, every basic block dominates itself, and the entry of a loop dominates all basic blocks in the loop.

Figure 11:
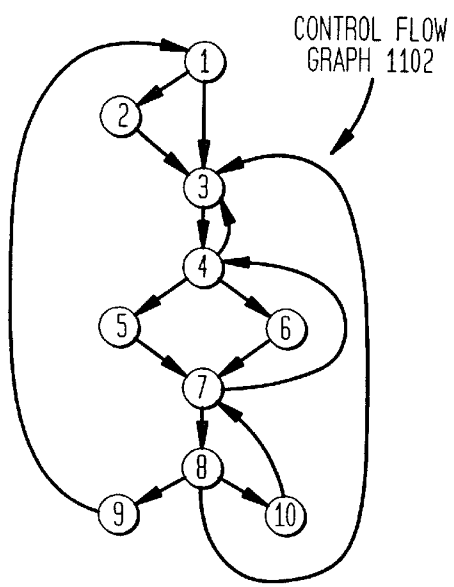
FIGS. 11–13 are used to describe dominance, dominator trees, and dominance frontiers.

Consider the example control flow graph 1102 with initial basic block 1 shown in FIG. 11. The initial basic block 1 dominates every basic block. Basic block 2 dominates only itself, since control can reach any other basic block along a path that begins 1→3. Basic block 3 dominates all but 1 and 2. Basic block 4 dominates all but 1, 2 and 3. Basic blocks 5 and 6 dominate only themselves, since flow of control can skip around either by going through the other. Finally, basic block 7 dominates 7, 8, 9, 10; basic block 8 dominates 8, 9, 10; 9 and 10 dominate only themselves.

Figure 12:
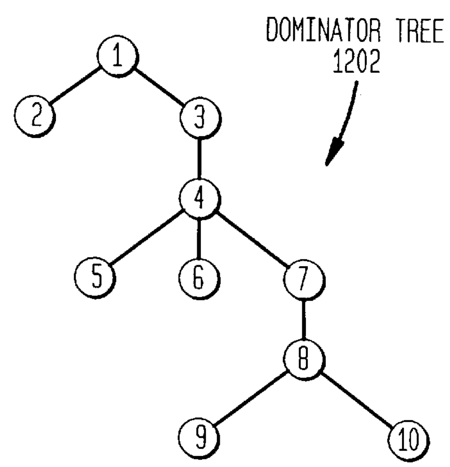

A useful way of presenting dominator information is in a tree, called the dominator tree, in which the initial basic block is the root, and each basic block d dominates only its descendants in the tree. For example, FIG. 12 shows the dominator tree for the control flow graph of FIG. 11.

Figure 13:
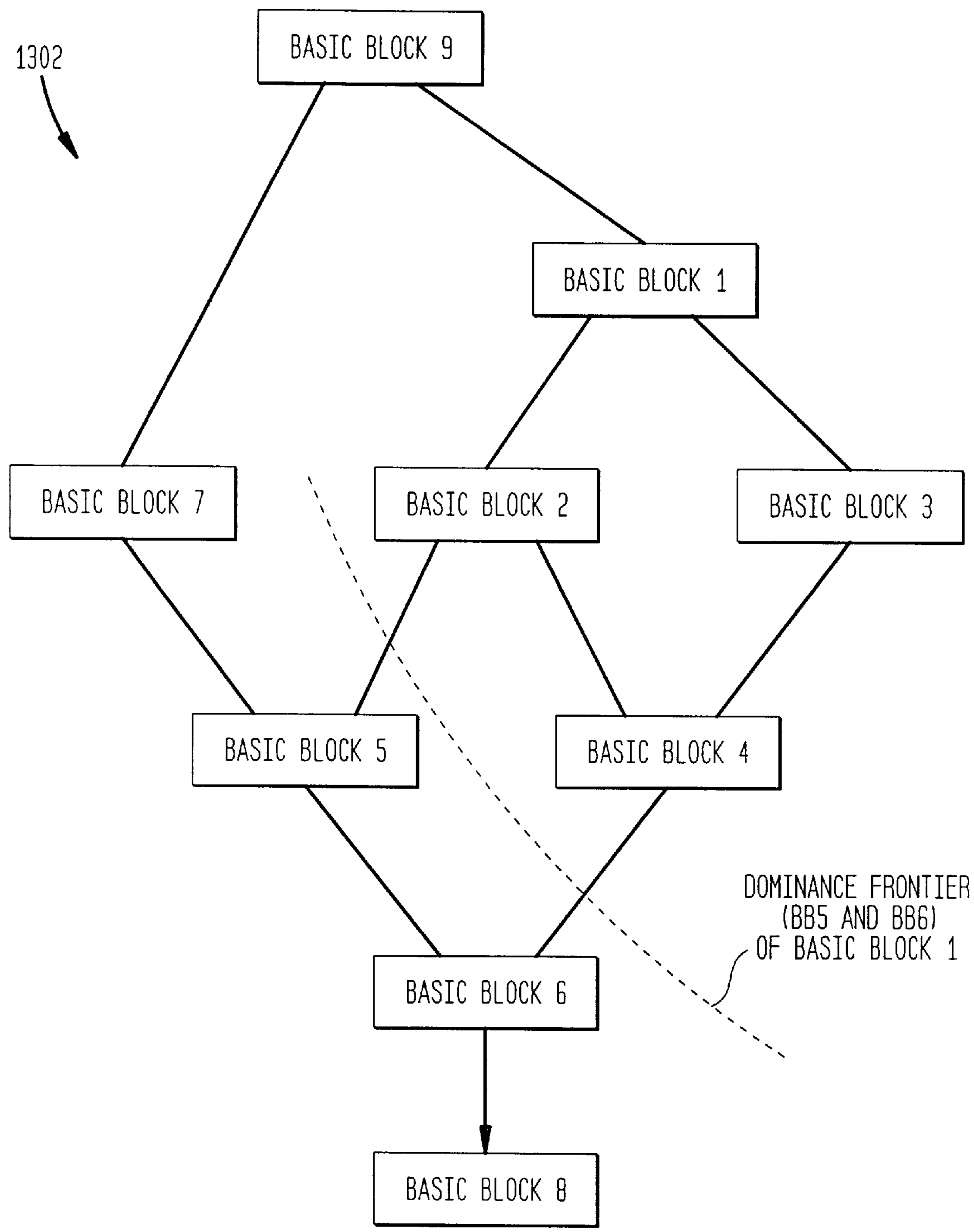

Dominance frontier is another useful concept. Dominance frontiers of a basic block A are the basic blocks that are not dominated by basic block A, but that are adjacent (linked) to basic blocks dominated by basic block A. Consider the example control flow graph 1302 in FIG. 13. Basic block 1 dominates basic blocks 2, 3, and 4. Basic blocks 5 and 6 are not dominated by basic block 1, but are adjacent to basic blocks 2 and 4, which are dominated by basic block 1. Accordingly, the dominance frontiers of basic block 1 are basic blocks 5 and 6.

These compiler concepts are described in Aho et al., *Compilers: Principles, Techniques, and Tools,* Addison Wesley, 1986. Dominance frontiers are described in R. Cytron, J. Ferrante, B. K. Rosen, M. N. Wegman, and F. K. Zadeck, "Efficiently computing static single assignment form and the control dependence graph," *ACM Trans. on Programming Languages and Systems,* 13(4):451–490, October 1991, incorporated herein by reference.

Figure 4:
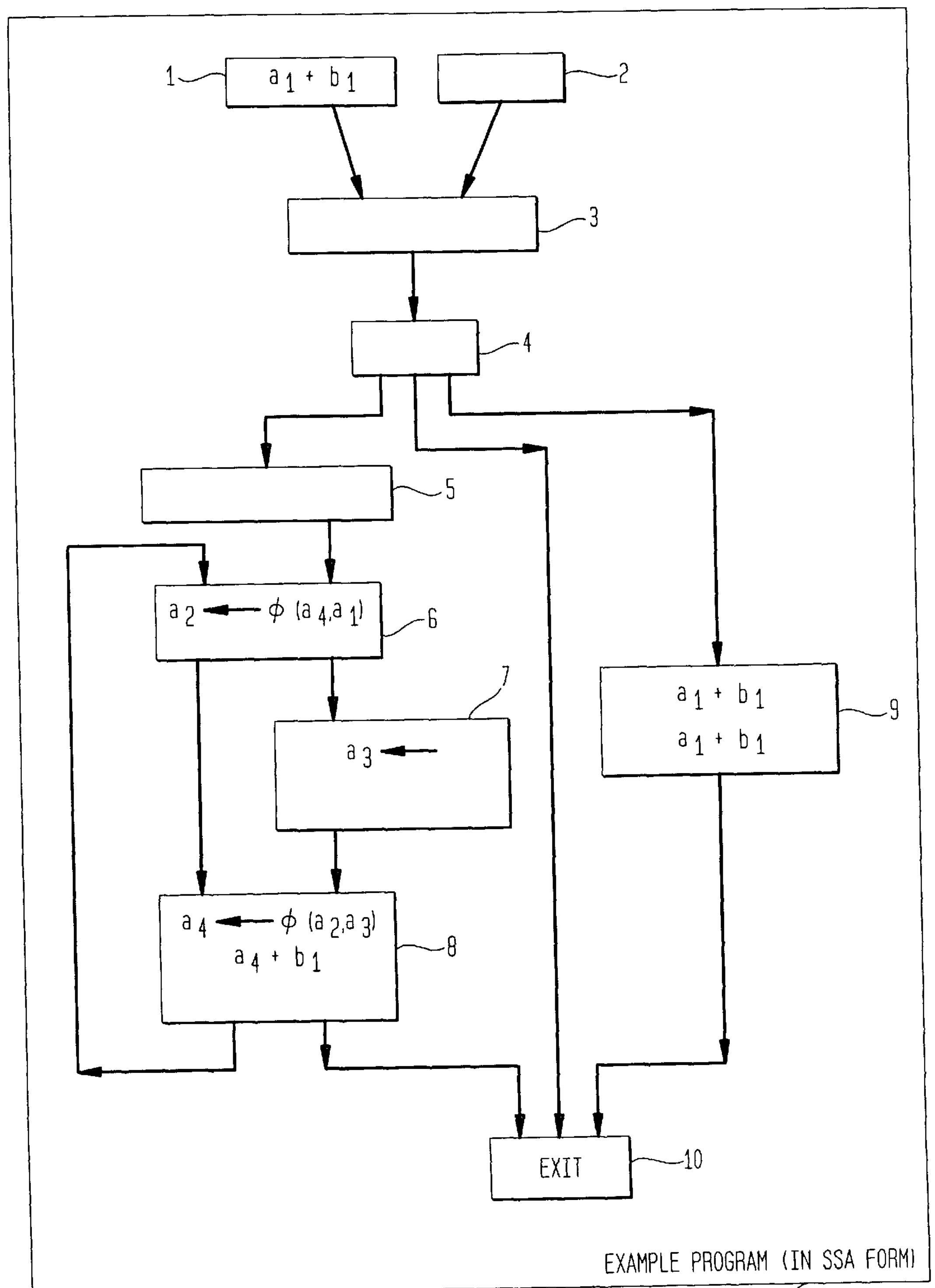
FIGS. 4–8 illustrate phases of an example program used to illustrate the operation of the present invention.

The following discussion is based on the expression a+b whose hypothetical temporary is h. An example program 402 shown in FIG. 4 is used to illustrate the various steps. Based on the algorithms described, the sections below also state and prove various lemmas, which are used in establishing the theorems about SSAPRE in Section 5.

4.1 The Φ -Insertion Step

Figure 14:
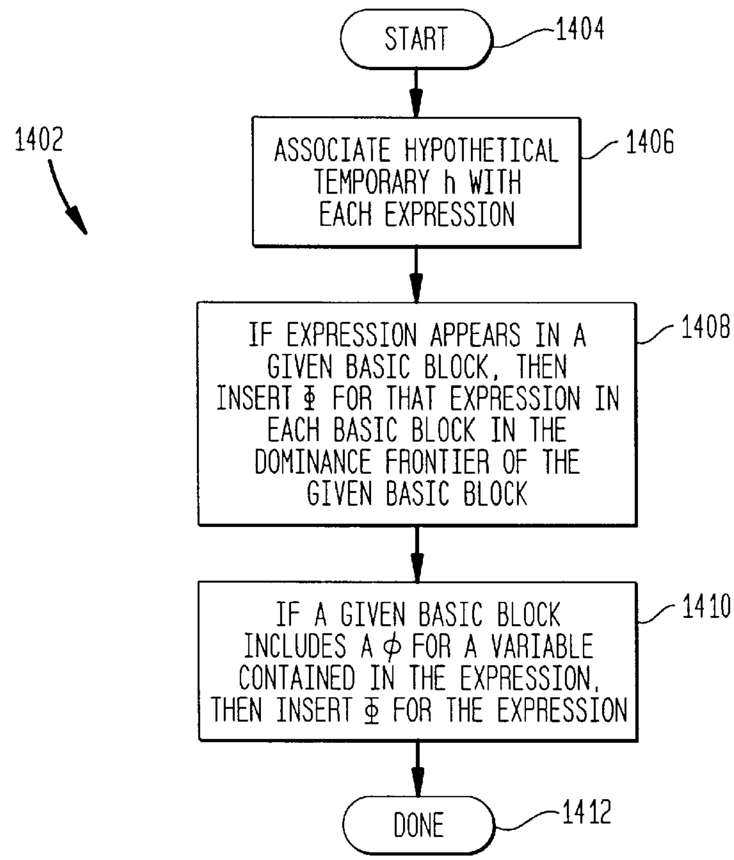
FIG. 14 is a flowchart representing the operation of a Φ-Insertion step according to an embodiment of the invention.

A Φ for an expression must be inserted whenever different values of the same expression reach a common point in the program. Φ's are inserted during step 912 (FIG. 9). The operation of the optimizer 106 when performing step 912 is represented by a flowchart 1402 in FIG. 14.

Figure 5:
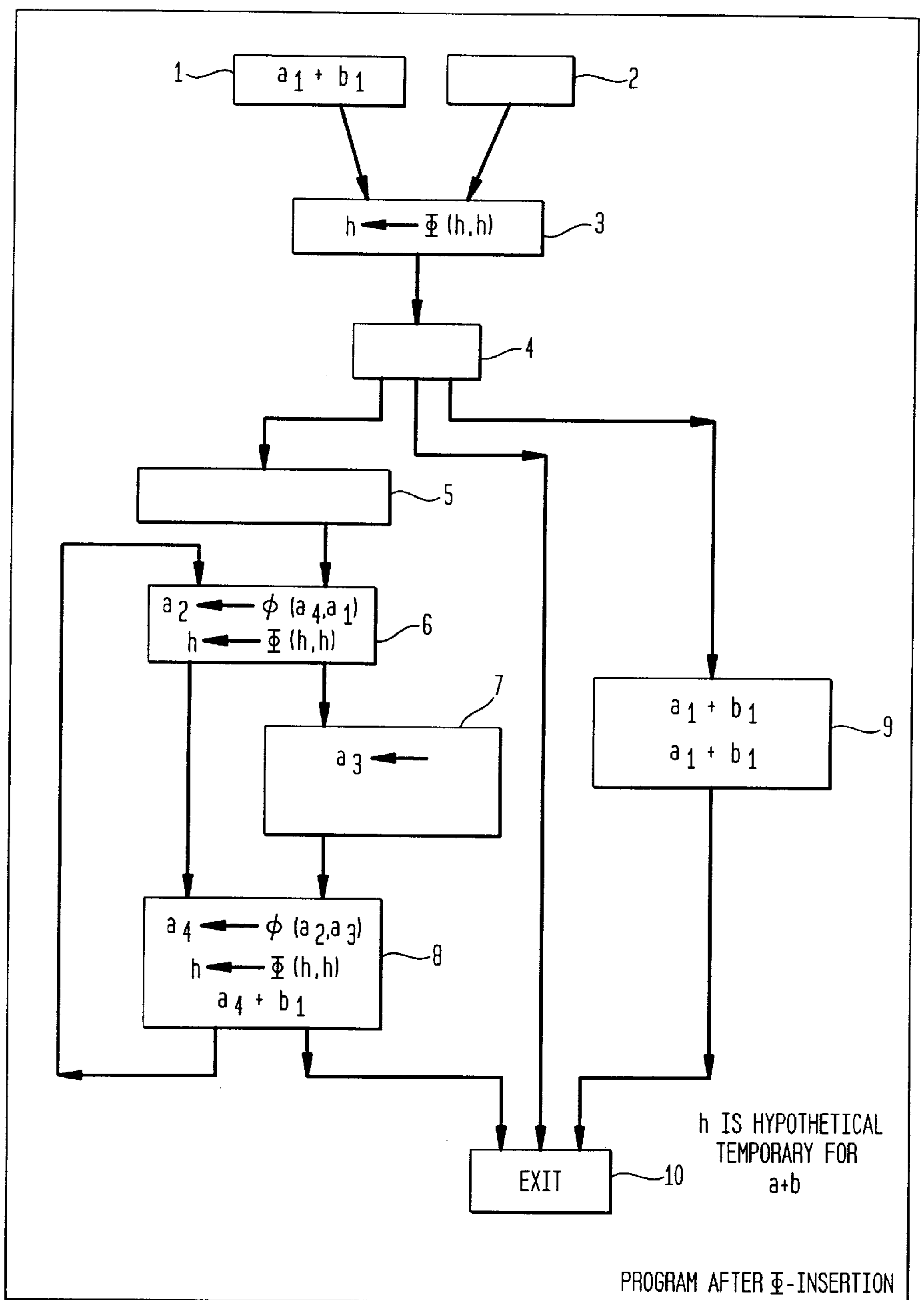

In step 1406, a hypothetical temporary h is associated with each expression or function in the control flow graph. For example, in FIG. 4, a hypothetical temporary h is associated with the expression $a_1+b_1$ in basic block There are two different situations that cause Φ's for expressions to be inserted:

First, when an expression appears in a basic block, the optimizer 106 must insert a Φ in the basic block's iterated dominance frontiers ($DF^+$), because the occurrence may correspond to a definition of h. This operation is represented by step 1408. For example, in FIG. 5 (that corresponds to the example control flow graph in FIG. 4), a Φ is inserted at block 3 due to a+b in block 1.

The second situation that causes insertion of Φ's is when there is a ϕ for a variable contained in the expression, because that indicates an alteration of the expression when it reaches a merge point. The optimizer 106 only inserts a Φ at a merge point when it reaches a later occurrence of the expression, because otherwise the Φ will not contribute to any optimization in PRE. Each inserted Φ function is assigned to a hypothetical variable h (this is consistent with the operation of step 1406, since Φ represents a function or expression). This operation is represented by step 1410. For example, in FIG. 5, the Φ for h inserted in block 8 is caused by the ϕ for a in the same block. It is not necessary to insert any Φ at block 10 even though it is a merge point, because there is no later occurrence of a+b after block 10.

Preferably, both types of Φ insertions (steps 1408 and 1410) are performed together in one pass over the program, with the second type of Φ insertion (step 1410) performed in a demand-driven way. Preferably, the optimizer 106 uses a set DF_phis[i] to keep track of the Φ's inserted due to $DF^+$ of the occurrences of expression $E_i$ (step 1408). The optimizer 106 uses a set Var_phis[i][j] to keep track of the Φ's inserted due to the occurrence of φ's for the $j^{th}$ variable in expression $E_i$ (step 1410). When the optimizer 106 encounters an occurrence of expression $E_i$, the optimizer 106 updates DF-phis[i]. For each variable $v_j$ in the occurrence, the optimizer 106 checks if it is defined by a φ. If it is, the optimizer 106 updates Var-phis[i][j], because a Φ at the block that contains the φ for $v_j$ may contribute to optimization of the current occurrence of $E_i$. The same may apply to earlier points in the program as well, so it is necessary to recursively check for updates to Var-phis[i][j] for each operand in the φ for $v_j$. After all occurrences in the program have been processed, the places to insert Φ's for $E_i$ are given by the union of DF-phis[i] with the Var-phis[i][j]'s.

By using this demand-driven technique, the invention takes advantage of the SSA representation in the input program.

The algorithm for the Φ-Insertion step 912 is alternatively represented using the following high level pseudocode:

```
procedure Φ-Insertion
    for each expression Ei do {
        DF_phis[i] ← empty-set
        for each variable j in Ei do
            Var_phis[i][j] ← { }
    }
    for each occurrence X of Ei in program do {
        DF_phis[i]← DF_phis[i] ∪ DF+ (X)
        for each variable occurence V in X do
            if (V is defined by φ) {
                j ← index of V in X
                Set_var_phis(Phi(V), i, j)
            }
    }
    for each expression Ei do {
        for each variable j in Ei do
            DF_phis[i]← DF_phis[i]∪ Var_phis[i][j]
        insert Φ's for Ei according to DF_phis[i]
    }
end Φ-Insertion
procedure Set_var_phis(phi, i, j)
    if (phi ∉ Var_phis[i][j]) {
        Var_phis[i][j] ← Var_phis[i][j] ∪ {phi}
        for each operand V in phi do
            if (V is defined by φ)
                Set_var_phis(Phi(V), i, j)
    }
end Set_var_phis
```

Copyright, Silicon Graphics, Inc., 1997

Well known algorithms for SSA φ placement with linear time complexity can alternatively be used to insert Φ's (that is, to implement the Φ-Insertion step 912), such as the algorithms described in R. Johnson, D. Pearson, and K. Pingali, "The program structure tree: Computing control regions in linear time," *Proceedings of the ACM SIGPLAN '94 Conference on Programming Language Design and Implementation,* pages 171–185, June 1994; V. Sreedhar and G. Gao, "A linear time algorithm for placing φ-nodes," *Conference Record of the Eighteenth ACM Symposium on Principles of Programming Languages,* pages 62–73, January 1995; and R. Cytron, J. Ferrante, B. K. Rosen, M. N. Wegman, and F. K. Zadeck., "Efficiently computing static single assignment form and the control dependence graph," *ACM Trans. on Programming Languages and Systems,* 13(4):451–490, October 1991, incorporated herein by reference in their entireties. Any modifications to these well known algorithms needed to insert Φ's as described above will be apparent to persons skilled in the relevant art(s) based on the discussion contained herein.

The correctness of the Φ-Insertion step 912 as described above is proven by the following LEMMA 1 and PROOF.

LEMMA 1 (Sufficiency of Φ insertion) If B is a basic block where no expression Φ is inserted and the expression is partially anticipated at the entry to B, exactly one evaluation of the expression (counting ⊥ as an evaluation) can reach the entry to B.

PROOF: Suppose at least two different evaluations of the expression, $\psi_1$ and $\psi_2$, reach the entry to B. It cannot be the case that $\psi_1$ and $\psi_2$ both dominate B; suppose without loss of generality that $\psi_1$ does not dominate B. Now there exists a block $B_0$ that dominates B, is reached by $\psi_1$ and $\psi_2$, and lies in $DF^+(\psi_1)$ (n.b., $B_0$ may be B). If $\psi_1$ is a computation of the expression, the Φ-Insertion step 912 must have placed a Φ in $B_0$, contradicting the proposition that $\psi_1$ reaches B. If on the other hand $\psi_1$ is an assignment to an operand v of the expression (so ⊥ is among the values reaching B), there must be a φ for v in $B_0$ by the correctness of the input SSA form. Hence when Φ-Insertion processed $B_0$, it must have placed a Φ there, once again contradicting the proposition that $\psi_1$ reaches B.

4.2 The Rename Step

During the Rename step 914, the optimizer 106 assigns SSA versions to h in its SSA form. The version numbering produced for h differs from the eventual SSA form for the temporary t, but has the following two important properties. First, occurrences that have identical h-versions have identical values (and are subject to possible elimination). Second, any control flow path that includes two different h-versions must cross an assignment to an operand of the expression or a Φ for h.

In performing the Rename step 914, the optimizer 106 preferably utilizes the well known SSA Renaming algorithm in which a preorder traversal of the dominator tree is conducted. This SSA Renaming algorithm is described in a number of publicly available documents, such as R. Cytron, J. Ferrante, B. K. Rosen, M. N. Wegman, and F. K. Zadeck, "Efficiently computing static single assignment form and the control dependence graph," *ACM Trans. on Programming Languages and Systems,* 13(4):451–490, October 1991, incorporated by reference herein. However, this SSA Renaming algorithm performed by the optimizer 106 is modified as follows. In addition to maintaining a renaming stack for each variable in the program, the optimizer 106 maintains a renaming stack for every expression; entries on these expression stacks are popped as, during the traversal of the dominator tree, the optimizer 106 backs up to the blocks that define them. Maintaining the variable and expression stacks together allows the optimizer 106 to decide efficiently whether two occurrences of an expression should be given the same h-version.

There are three kinds of occurrences of expressions in the program: (1) the expressions in the original program, which are herein called real occurrences: (2) the Φ's inserted in the Φ-Insertion step 912; and (3) Φ operands, which are regarded as occurring at the exits of the predecessor nodes of the corresponding edges. The Rename step 914 performs the following steps upon encountering an occurrence q of the expression $E_i$. If q is a Φ, the optimizer 106 assigns q a new version. Otherwise, the optimizer 106 checks the current version of every variable in $E_i$(i.e., the version on the top of each variable's rename stack) against the version of the corresponding variable in the occurrence on the top of $E_i$'s rename stack. If all the variable versions match, the optimizer 106 assigns q the same version as the top of $E_i$'s stack. If any of the variable versions does not match, then there are two cases: (a) if q is a real occurrence, the optimizer 106 assigns q a new version; (b) if q is a Φ operand, the optimizer 106 assigns the special version ⊥ to that Φ operand to denote that the value of $E_i$ is unavailable at that point. Finally, the optimizer 106 pushes q on $E_i$'s stack and proceeds. For example, FIG. 6 (corresponding to the example of FIGS. 4 and 5) shows the dense SSA graph that results after h in the example has been renamed. This expression renaming technique also takes advantage of the SSA representation of the program variables.

The remaining steps of the SSAPRE algorithm (described below) rely on the fact that Φ's are placed only where $E_i$ is partially anticipated (i.e., there is no dead Φ in the SSA graph of h). Dead Φ's can efficiently be identified by applying the standard SSA-based dead store elimination algorithm (described in R. Cytron, J. Ferrante, B. K. Rosen, M. N. Wegman, and F. K. Zadeck, "Efficiently computing static single assignment form and the control dependence graph," *ACM Trans. on Programming Languages and Systems,* 13(4):451–490, October 1991, incorporated by reference herein) on the SSA graph formed after renaming. From here on, it is assumed that only live Φ's are represented in the SSA form of h.

The correctness of the Rename step 914 as described above is proven by the following LEMMAS and PROOFS.

LEMMA 2 (Correctness of version renaming) If two occurrences are assigned the same version by Rename, the expression has the same value at those two occurrences.

PROOF: This lemma follows directly from the fact that the Rename step 914 assigns the same version to two occurrences of an expression $E_i$ only if all the SSA versions of their expression operands match. This proof can be completed by reference to the single-assignment property and the correctness of the SSA renaming algorithm for variables (described in R. Cytron, J. Ferrante, B. K. Rosen, M. N. Wegman, and F. K. Zadeck, "Efficiently computing static single assignment form and the control dependence graph," *ACM Trans. on Programming Languages and Systems,* 13(4):451–490, October 1991).

LEMMA 3 (Versions capture all the redundancy) If two occurrences $\psi_x$, $\psi_y$ are assigned versions x, y by Rename, exactly one of the following holds:

- no control flow path can reach from $\psi_x$ to $\psi_y$ without passing through a real (i.e., non-ϕ) assignment to an operand of the expression (meaning that there is no redundancy between the occurrences); or
- there is a path (possibly empty, in which case x=y) in the SSA graph of use-def arcs from y to x (implying that any redundancy between $\psi_x$ and $\psi_y$ is exposed to the algorithm).

PROOF: Suppose there is a control flow path $\mathcal{P}$ from $\psi_x$ to $\psi_y$ that does not pass through any assignment to an operand of the expression. The proof will proceed by induction on the number of Φ's for the expression traversed by $\mathcal{P}$. If $\mathcal{P}$ encounters no Φ, x=y establishing the basis for our induction. If $\mathcal{P}$ hits at least one Φ, the last Φ on $\mathcal{P}$ defines $\psi_y$. Now the induction hypothesis is applied to that part of $\mathcal{P}$ up to the corresponding operand of that Φ.

4.3 The DownSafety Step

One criterion required for PRE to insert a computation is that the computation is down-safe (or anticipated) at the point of insertion. Down safety is a well known concept. Down safe flags are designated as "ds" in the figures.

Figure 15:
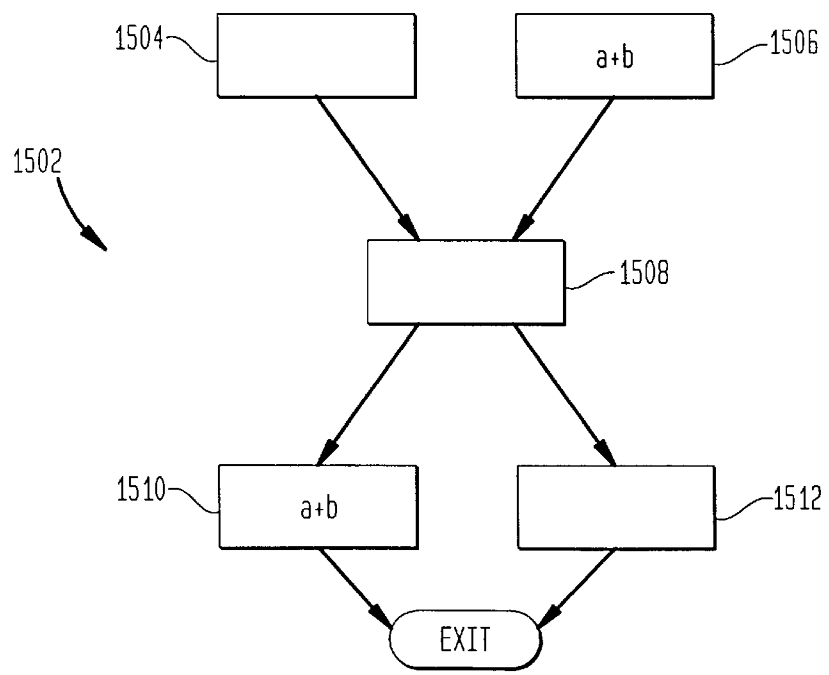
FIG. 15 is used to describe down safety.

Down safety is briefly described with reference to FIG. 15. The expression a+b in basic blocks 1506 and 1510 is partially redundant. The issue is whether the expression a+b can be inserted into basic block 1504 (for the purpose of eliminating the occurrence of expression a+b in basic block 1510). a+b can only be inserted into basic block 1504 if that insertion would be down safe. An insertion is not down-safe if there is a control flow path from that insertion in which the expression is not evaluated before program exit. The path from basic block 1504 to basic block 1512 via basic block 1508 is such a path. Accordingly, an insertion of the expression a+b in basic block 1504 is not down safe. Thus, the insertion should not take place.

In the dense SSA graph constructed by the Rename step 914, each node either represents a real occurrence of the expression or is a Φ. It can be shown that SSAPRE insertions are only necessary at Φ's, so down-safety only needs to be computed for them. Using the SSA graph, down-safety is sparsely computed by backward propagation along the use-def edges.

A Φ is not down-safe if there is a control flow path from that Φ along which the expression is not evaluated before program exit or before being altered by redefinition of one of its variables. Except for loops with no exit, this can happen only due to one of the following cases: (a) there is a path to exit along which the Φ result version is not used; or (b) there is a path to exit along which the only use of the Φ result version is as an operand of a Φ that is not down-safe. Case (a) represents the initialization for the backward propagation of down-safety; all other Φ 's are initially marked down_safe. DownSafety propagation is based on case (b). Since a real occurrence of the expression blocks the case (b) propagation, the algorithm marks each Φ operand with a flag has_real_use when the path to the Φ operand crosses a real occurrence of the same version of the expression.

It is convenient to perform initialization of the case (a) down_safe and computation of the has_real_use flags during a dominator-tree preorder pass over the SSA graph. Since the Rename step 914 conducts such a pass, the optimizer 106 preferably includes these calculations in the Rename step 914 with minimal overhead.

Figure 16:
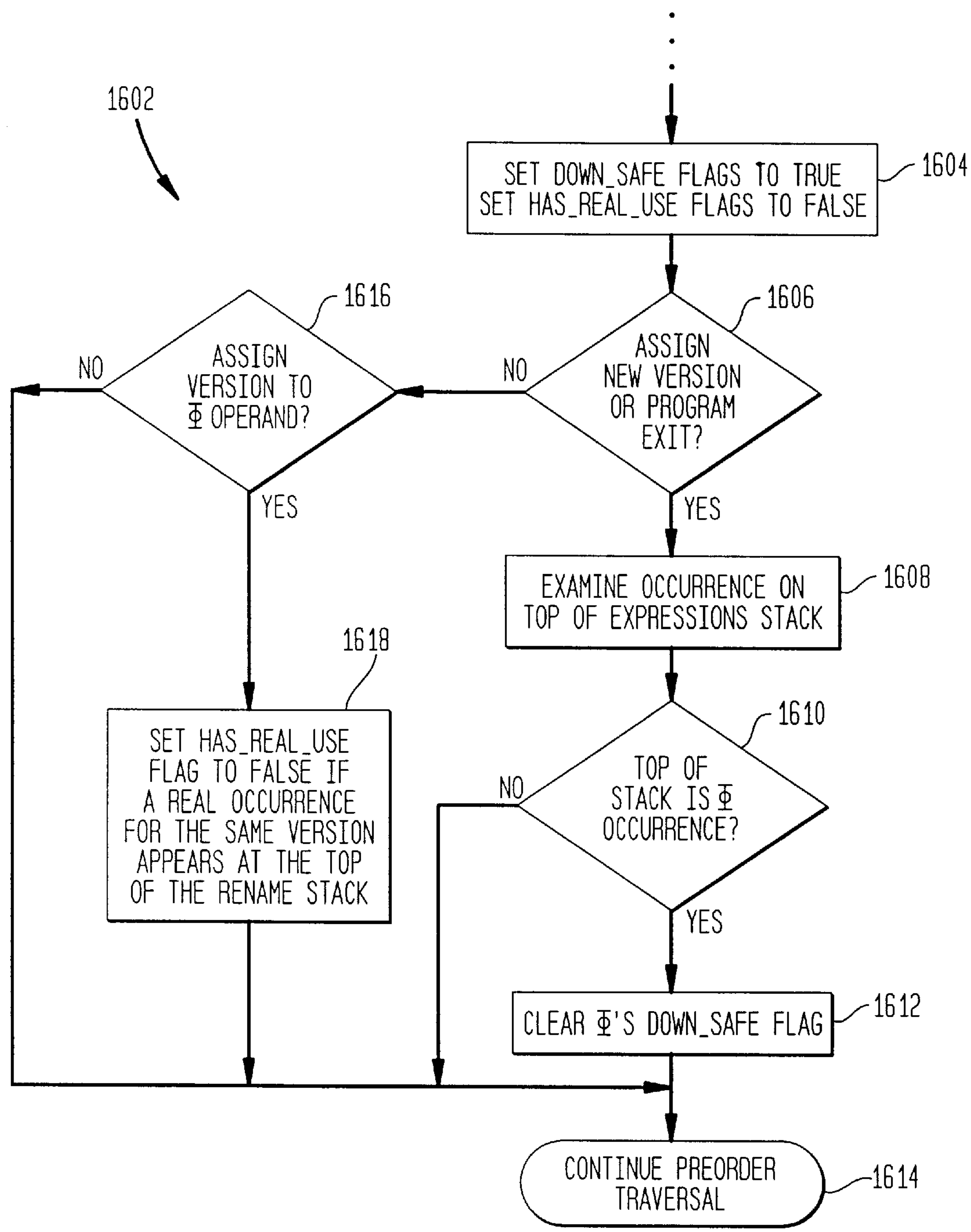
FIG. 16 is a flowchart representing the operation of a Down Safety step according to an embodiment of the invention.

The operation of the optimizer 106 when performing the tasks related to down safe during the Rename step 914 is represented in a flowchart 1602 shown in FIG. 16. Initially, in step 1604, all down safe flags are true and all has_real_use flags are false. When the Rename step 914 assigns a new version to a real occurrence of expression $E_i$ or encounters a program exit, it examines the occurrence on the top of $E_i$'s stack before pushing the current occurrence (steps 1606 and 1608). If the top of stack is a Φ occurrence, the Rename step 914 clears that Φ's down_safe flag because the version it defines is not used along the path to the current occurrence (or exit). This is represented by steps 1610 and 1612. When the Rename step 914 assigns a version to a Φ operand, it sets that operand's has_real_use flag if and only if a real occurrence for the same version appears at the top of the rename stack. This is represented by steps 1616 and 1618.

As indicated by step 1614, after performance of the down safe steps, the optimizer 106 continues with the Rename step 914.

The DownSafety propagation algorithm 918 is alternatively represented by the following high level pseudocode:

```
procedure DownSafety
    for each expr-Φ F in program do
        if (not down_safe (F))
            for each operand opnd of F do
                Reset_downsafe (opnd)
end DownSafety
procedure Reset_downsafe(X)
    if (has_real_use(X) or X not defined by Φ)
        return
    F ← Φ that defines X
    if (not down_safe(F))
        return
    down_safe(F) ← false
    for each operand opnd of F do
        Reset_downsafe(opnd)
end Reset_downsafe
```

Copyright, Silicon Graphics, Inc., 1997

The correctness of the Down Safety step 918 as described above is proven by the following LEMMA and PROOF.

LEMMA 4 (Correctness of down_safe). A Φ is marked down_safe after DownSafety if and only if the expression is fully anticipated at that Φ.

PROOF: It is first noted that each Φ marked not down_safe during the Rename step 914 is indeed not down-safe. The SSA renaming algorithm has the property that every definition dominates all its uses. Suppose that a Φ appears on the top of the stack when the Rename step 914 creates a new version or encounters a program exit. In the case where a program exit is encountered, the Φ is obviously not down-safe because there is a path in the dominator tree from the Φ to exit containing no use of the Φ. Similarly, if the Rename step 914 assigns a new version to a real occurrence, it does so because some expression operand has a different version in the current occurrence from its version at the Φ. Therefore, there exists a path in the dominator tree from the Φ to the current occurrence along which there is an assignment to ν. Minimality of the input HSSA program implies, then, that any path from the Φ to the current occurrence and continuing to a program exit must encounter an assignment to ν before encountering an evaluation of the expression. Therefore the expression is not fully anticipated at the Φ.

Next we make the observation that any Φ whose down_safe flag gets cleared during the DownSafety step 918 is not down-safe, since there is a path in the SSA use-def graph from an unused version to that Φ where no arc in the path crosses any real use of the expression value. Indeed one such path appears on the recursion stack of the Reset_downsafe procedure at the time the down_safe flag is cleared.

Finally, it is necessary to show that all the Φ's that are not down-safe are so marked at the end of DownSafety. This fact is a straightforward property of the depth-first search propagation performed by Reset_downsafe.

4.4 The WillBeAvail Step

The WillBeAvail step 920 has the task of predicting whether an expression will be available at each Φ result following insertions for PRE. In the Finalize step 922, insertions will be performed at incoming edges corresponding to Φ operands at which the expression will not be available (without that insertion), but the Φ's will_be$_{13}$ avail predicate is true.

Figure 17:
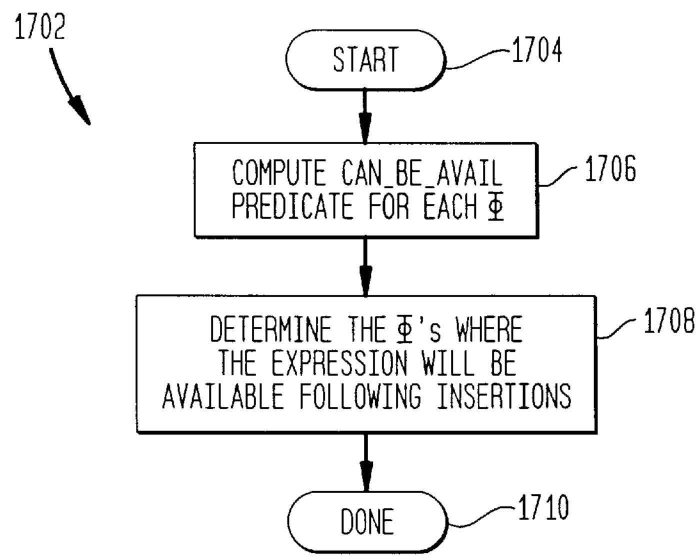
FIG. 17 is a flowchart representing the operation of a Will Be Available step according to an embodiment of the invention.

The operation of the optimizer 106 when performing the WillBeAvail step 920 is represented by a flowchart 1702 shown in FIG. 17. The WillBeAvail step 920 includes two forward propagation passes performed sequentially, in which the optimizer 106 conducts a reachability search in the SSA graph for each expression. The first pass (represented by step 1706) computes the can_be_avail predicate for each Φ by first initializing it to true for all Φ's. It then begins with the "boundary" set of ΦD's at which the expression cannot be made available by any down-safe set of insertions. These are Φ's that do not satisfy the down_safe predicate and have at least one ⊥-valued operand. The can_be_avail predicate is set to false and the false value is propagated from such nodes to others that are not down-safe and that are reachable along def-use arcs in the SSA graph, excluding arcs at which has_real_use is true. Φ operands defined by Φ's that are not can_be_avail are set to ⊥ along the way. After this propagation step, can_be_avail is false for a Φ if and only if no down-safe placement of computations can make the expression available.

The Φ's where can_be_avail is true together designate the range of down-safe program areas for insertion of the expression, plus areas that are not down-safe but where the expression is fully available in the original program. The entry points to this region (the ⊥-valued Φ operands) can be thought of as SSAPRE's earliest insertion points.

The second pass (represented by step 1708) works within the region computed by the first pass to determine the Φ's where the expression will be available following the insertions that will actually be made, which implicitly determines the latest (and final) insertion points. It works by propagating the later predicate, which it initializes to true wherever can_be_avail is true. It then begins with the real occurrences of the expression in the program, and propagates the false value of later forward to those points beyond which insertions cannot be postponed (moved downward) without introducing unnecessary new redundancy.

At the end of the second pass, will_be_avail for a Φ is given by $$will\_be\_avail = can\_be\_avail \wedge \neg\ later.$$

Figure 6:
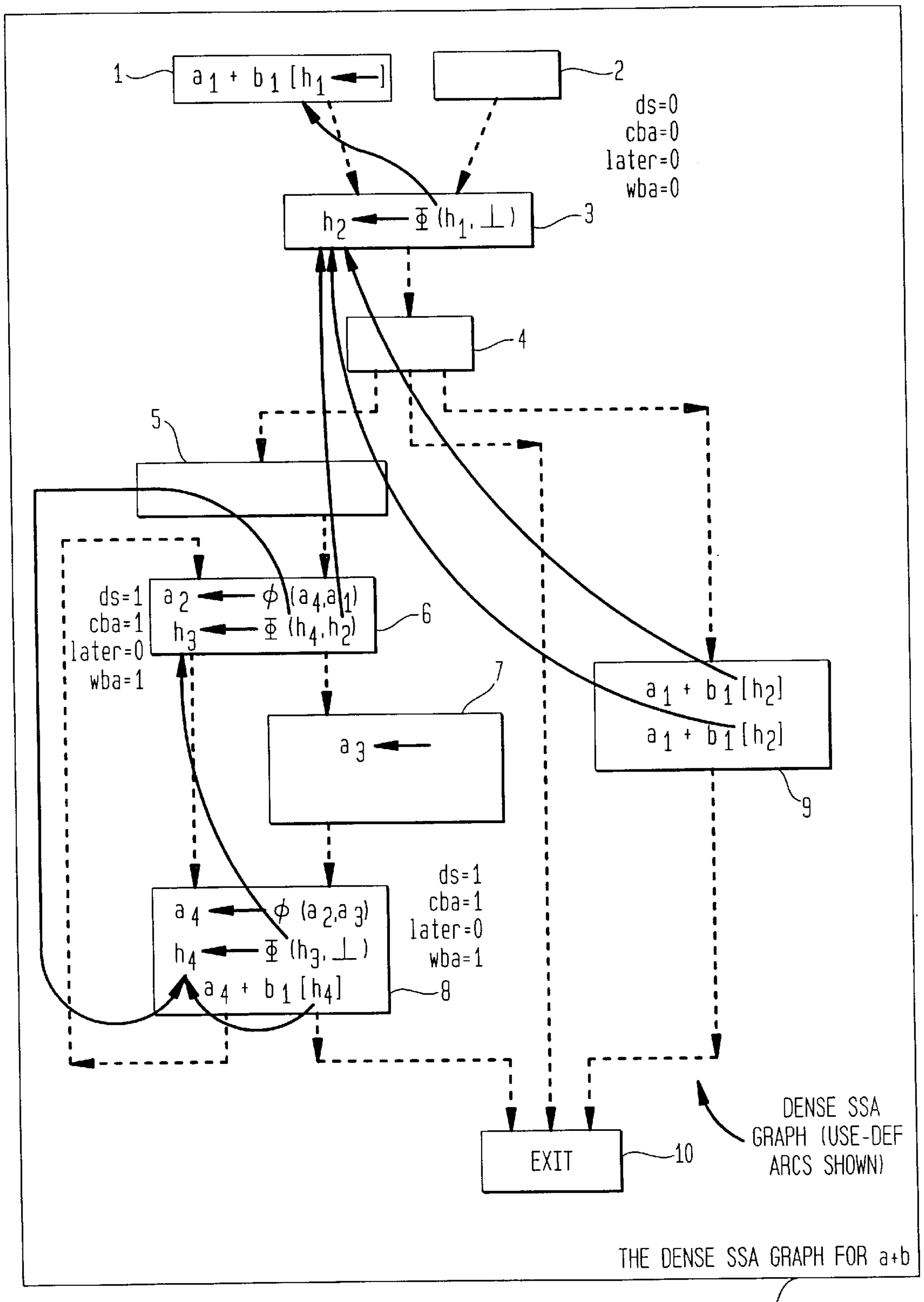

FIG. 6 shows the values of down_safe (ds), can_be_avail (cba), later and will_be_avail (wba) for the program example at each Φ for h. For convenience, a predicate is defined to indicate those Φ operands where insertions will be performed: It is said that insert holds for a Φ operand if and only if the following hold:

the Φ satisfies will_be_avail; and the operand is ⊥ or has_real_use is false for the operand and the operand is defined by a Φ that does not satisfy will_be_avail.

The invention preferably uses the term placement to refer to the set of points in the program where a particular expression's value is computed.

The WillBeAvail step 920 is alternatively represented by the following high level pseudocode:

```
procedure Compute_can_be_avail
    for each expr-Φ F in program do
        if (not down_safe(F) and
            can_be_avail (F) and
            ∃ an operand of F that is ⊥)
            Reset_can_be_avail(F)
end Computer_can_be_avail
procedure Reset_can_be_avail(G)
    can_be_avail(G) ← false
    for each expr-Φ F with operand opnd defined by G do
        if (not has_real_use(opnd)) {
            set that Φ operand to ⊥
            if (not down_safe (F) and can_be_avail (F))
                Reset_can_be_avail (F)
```

-continued

```
    }
end Reset_can_be_avail
procedure Compute_later
    for each expr-Φ F in program do
        later (F) ← can_be_avail (F)
    for each expr-Φ F in program do
        if (later (F)) and
            ∃ an operand opnd of F such that
                (opnd ≠ ⊥ and has_reach_use (opnd)))
            Reset_later (F)
end Computer_later
procedure Reset_later (G)
    later (G) ← false
    for each expr-Φ F with operand opnd defined by G do
        if (later (F))
            Reset_later (F)
end Reset_later
procedure Will Be Avail
    Compute_can_be_avail
    Compute_later
end Will Be Avail
```

Copyright, Silicon Graphics, Inc., 1997

The correctness of the WillBeAvail step 920 as described above is proven by the following LEMMAS and PROOFS.

LEMMA 5 (Correctness of can_be_avail). A Φ satisfies can_be_avail if and only if some safe placement of insertions makes the expression available immediately after the Φ.

PROOFS: Let F be a Φ satisfying can_be_avail. If Φ satisfies down_safe, the result is immediate because it is safe to insert computations of the expression at each of Φ's operands. If F is not down-safe and satisfies can_be_avail, note that the expression is available in the unoptimized program at F because there is no path to F from a Φ with a ⊥-valued operand along def-use arcs in the SSA graph.

Now let F be a Φ that does not satisfy can_be_avail. When the algorithm resets this can_be_avail flag, the recursion stack of Reset_can_be_avail gives a path bearing witness to the fact that no safe set of insertions can make the expression available at F.

LEMMA 6 (Correctness of later). A can_be_avail Φ satisfies later after WillBeAvail if and only if there exists a computationally optimal placement under which that Φ's result is not available immediately after the Φ.

PROOF: The set of Φ's not satisfying later after WillBeAvail is exactly the set of can_be_avail Φ's reachable along defuse arcs in the SSA graph from has_real_use operands of can_be_avail Φ's. Let $\mathcal{P}$ e a path in the def-use SSA graph from such a Φ operand to a given expr-Φ F with later(F)=false. We will prove by induction on the length of $\mathcal{P}$ that F must be made available by any computationally optimal placement.

If F is not down-safe, the fact that F is can_be_avail means all of F's operands must be fully available in the unoptimized program. They are therefore trivially available under any computationally optimal placement, making the result of F available as well.

In the case where F is down-safe, if $\mathcal{P}$ contains no arcs there is a $has_{13}$ real_use operand of F. Such an operand must be fully available in the optimized program, so any insertion below F would be redundant with that operand, contradicting computational optimality. Since F is down-safe, that operand is already redundant with real occurrence(s) in the unoptimized program and any computationally optimal placement must eliminate that redundancy. The way to accomplish this is to perform insertions that make the expression fully available at F.

If F is down-safe and $\mathcal{P}$ contains at least one arc, we apply the induction hypothesis to the Φ defining the operand of F corresponding to the final arc on $\mathcal{P}$ to conclude that operand must be made available by any computationally optimal placement. As a consequence, any computationally optimal placement must make F available by the same argument as in the basis step (previous paragraph).

The following lemma shows that the will_be_avail predicate computed by WillBeAvail faithfully corresponds to availability in the program after insertions are performed for Φ operands satisfying insert.

LEMMA 7 (Correctness of will_be_avail). The set of insertions chosen by SSAPRE together with the set of real occurrences makes the expression available immediately after a Φ if and only if that Φ satisfies will_be_avail.

PROOF: We establish the "if" direction with a simple induction proof showing that if there is some path leading to a particular Φ in the optimized program along which the expression is unavailable, that Φ does not satisfy will_be_avail. Let Q(k) be the following proposition:

For any expr-Φ F, if there is a path P(F) of length k in the SSA def-use graph beginning with ⊥, passing only through Φ's that are not will_be_avail along arcs that do not satisfy has_real_use ∨insert, and ending at F, F is not will_be_avail.

Q(0) follows directly from the fact that no insertion is performed for any operand of F, since it is not marked will_be_avail. The fact that F has a ⊥-valued operand implies that such an insertion would be required to make F available.

Now to see Q(k) for k>0, notice that Q(k−1) implies that the operand of F corresponding to the final arc of $\mathcal{P}$ (F) is defined by a Φ that is not will_be_avail, and there is no real occurrence of the expression on the path from that defining Φ to the operand of F. Since we do not perform an insertion for that operand, F cannot satisfy will-be-avail.

To establish the "only if" direction, suppose expr-Φ D F does not satisfy will-be-avail. Either F does not satisfy can-be-avail or F satisfies later. In the former case, F is not available in the optimized program because the insertions performed by SSAPRE are down-safe. In the latter case, F was not processed by Reset_Later, meaning that it is not reachable along def-use arcs from a Φ satisfying will-be-avail. Therefore, insertion above F would be required to make F's result available, but F is not will-be-avail so the algorithm performs no such insertion.

4.5 The Finalize Step

Figure 18:
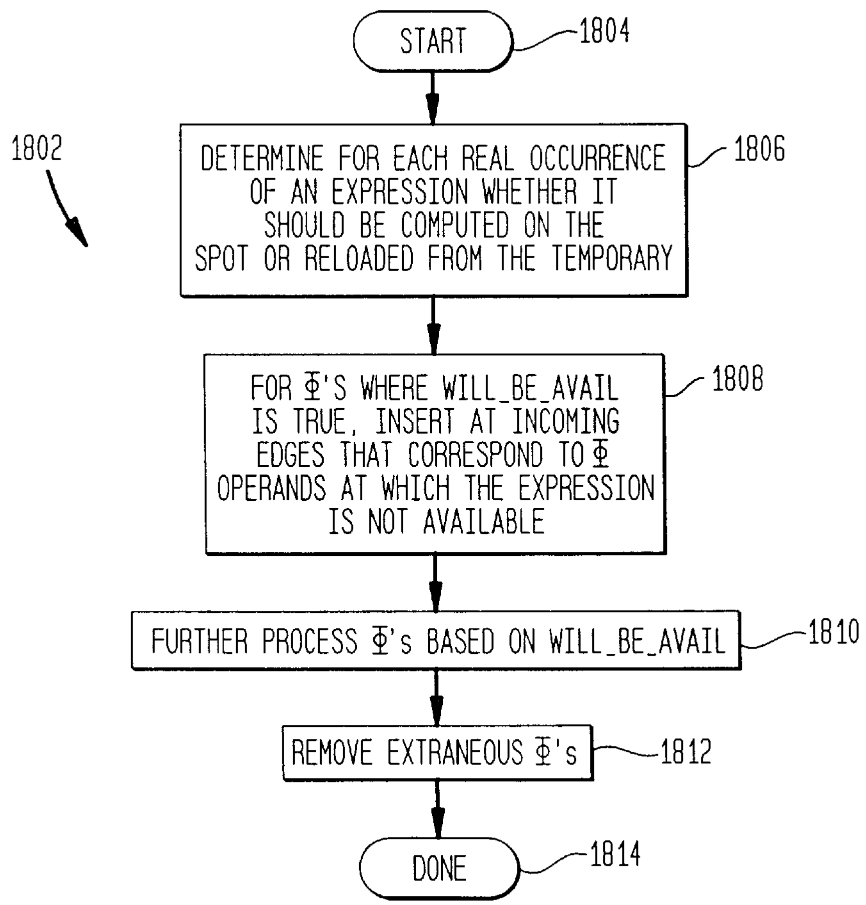
FIG. 18 is a flowchart representing the operation of a Finalize step according to an embodiment of the invention.

The Finalize step 922 plays the role of transforming the SSA graph for the hypothetical temporary h to the valid SSA form that reflects insertions and in which no Φ operand is ⊥. This valid SSA form is stored in a precise SSA graph 924. Operation of the optimizer 106 when performing the Finalize step 922 is represented by a flowchart 1802 in FIG. 18. When performing the Finalize step 922, the optimizer 106 performs the following tasks:

It decides for each real occurrence of the expression whether it should be computed on the spot or reloaded from the temporary. For each one that is computed, it also decides whether the result should be saved to the temporary. It sets two flags, reload and save, to represent these two pieces of information. This is represented by step 1806.

For Φ's where will-be-avail is true, insertions are performed at the incoming edges that correspond to Φ operands at which the expression is not available. This is represented by step 1808.

Expression Φ's whose will-be-avail predicate is true may become ϕ's for t. Φ's that are not will-be-avail will not be part of the SSA form for t, and links from will-be-avail Φ's that reference them are fixed up to refer to other (real or inserted) occurrences. This is represented by step 1810.

Extraneous Φ's are removed. This is represented by step 1812.

The flags discussed herein are generally called insertion information.

The Finalize step 922 creates a table Avail-$def_i$ (for available definitions) for each expression $E_i$ to perform the first three of the above tasks. The indices into this table are the SSA versions for $E_i$'s hypothetical temporary h. Avail-$def_i$[x] points to the defining occurrence of $E_i$ for $h_x$, which must be either: (a) a real occurrence; or (b) a Φ for which will-be-avail is true.

The Finalize step 922 performs a preorder traversal of the dominator tree of the program control flow graph. In the course of this traversal it will visit each defining occurrence whose value will be saved to a version of the temporary, $t_y$, before it visits the occurrences that will reference $t_y$; such a reference is either: (a) a redundant computation that will be replaced by a reload of $t_y$, or (b) a use of $h_x$ as a Φ operand that will become a use of $t_y$ as a ϕ operand. Although in an embodiment of the invention the processing order of the Finalize step 922 is modeled after the standard SSA rename step (described in R Cytron, J. Ferrante, B. K. Rosen, M. N. Wegman, and F. K. Zadeck, "Efficiently computing static single assignment form and the control dependence graph," *ACM Trans. on Programming Languages and Systems,* 13(4):451–490, October 1991, incorporated by reference herein), the Finalize step 922 does not require any renaming stack because SSA versions have already been assigned.

In the course of its traversal, the Finalize step 922 processes occurrences as follows:

1. Φ—If its will-be-avail is false, nothing needs to be done. (An example of this is the Φ in block 3 of the running example. See FIG. 6.) Otherwise, $h_x$ must be visited for the first time. Set Avail-$def_i$[x] to this Φ.
2. Real occurrence of $E_i$—If Avail-$def_i$[x] is ⊥, $h_x$ is being visited for the first time. If Avail-$def_i$[x] is set, but that occurrence does not dominate the current occurrence, the current occurrence is also a definition of $h_x$. (An example of this latter case is the first $h_2$ in block 9 of FIG. 6.) In both of these cases, Avail-$def_i$[x] is updated to the current occurrence. Otherwise, the current occurrence is a use of $h_x$, and the save flag is set in the occurrence pointed to by Avail-$def_i$[x] and the reload flag of the current occurrence.
3. Operand of Φ in a successor block Recall that Φ operands are considered as occurring at their corresponding predecessor blocks.)—If will-be-avail of the Φ is false, nothing needs to be done. Otherwise if the operand satisfies insert (e.g., operand $h_2$ in the Φ at block 6 of FIG. 6), insert a computation of $E_i$ at the exit of the current block. If will-be-avail holds but the operand does not satisfy insert, set the save flag in the occurrence pointed to by Avail-$def_i$[x] (which cannot be ⊥), and update that Φ operand to refer to Avail-$def_i$[x] (e.g., operand $h_3$ in the Φ at block 8 of FIG. 6).

The Finalize step 922 is alternatively represented by the following high level pseudocode:

```
procedure Finalize_visit (block)
    for each occurrence X of Ei in block do {
        save (X) ← false
        reload (X) ← false
        x ← version (X)
        if (X is Φ) {
            if (will_be_avail (X))
                Avail_def[i][x] ← X
        }
        else if (Avail_def[i][x] is ⊥ or
            Avail_def[i][x] does not dominate X)
            Avail_def[i][x] ← X
        else if (Avail_def[i][x] is real) {
            save (Avail_def[i][x]) ← true
            reload (X) ← true
        }
    }
    for each S in Succ (block) do {
        j ← WhichPred (S, block)
        for each expr-Φ F in S do
            if (will_be_avail (F)) {
                i ← Which Expr (F)
                if (jth operand of F satisfies insert) {
                    insert Ei at the exit of block
                    set (jth operand of F to inserted occurrence
                }
                else {
                    x ← version (jth operand of F)
                    if (Avail_def[i][x] is real) {
                        save (Avail_def[i][x]) ← true
                        set jth operand of F to Avail_def[i][x]
                    }
                }
            }
    }
    for each K in Children (DT, block) do
        Finalize_visit (K)
end Finalize_visit
procedure Finalize
    for each version x of Ei in program do
        Avail_def[i][x] ← ⊥
    Finalize_visit (Root (DT))
end Finalize
```

Copyright, Silicon Graphics, Inc., 1997

The removal of extraneous Φ's, or SSA minimization, for h is not a necessary task as far as PRE is concerned. However, the extraneous Φ's take up storage in the program representation, and may affect the efficiency of other SSA-based optimizations to be applied after PRE. Removing extraneous Φ's also requires changing their uses to refer to their replacing versions. SSA minimization can be implemented as a variant of the ϕ insertion step in SSA construction. All of the ϕ's are initially marked as being extraneous. Applying the ϕ insertion algorithm, the optimizer 106 can find and mark the Φ's that are not extraneous based on the iterated dominance frontier of the set of real assignments to h in the program (i.e., real occurrences with the save bit set plus the inserted computations). The optimizer 106 then passes over all the extraneous Φ's to determine a replacing version for each one. Whenever an extraneous Φ defines version $h_x$ and has an operand using $h_y$ that is not defined by an extraneous Φ, y is the replacing version for x. From such a Φ the optimizer 106 propagates the replacing version through all its uses: once the replacing version for a Φ is known, the replacing version for every use of that Φ becomes known (the replacing version of each use is the same as the replacing version of the Φ) and the optimizer 106 propagates recursively to all uses of that Φ. It is straightforward to see that this method replaces all references to extraneous Φ's by references to non-extraneous occurrences.

Figure 7:
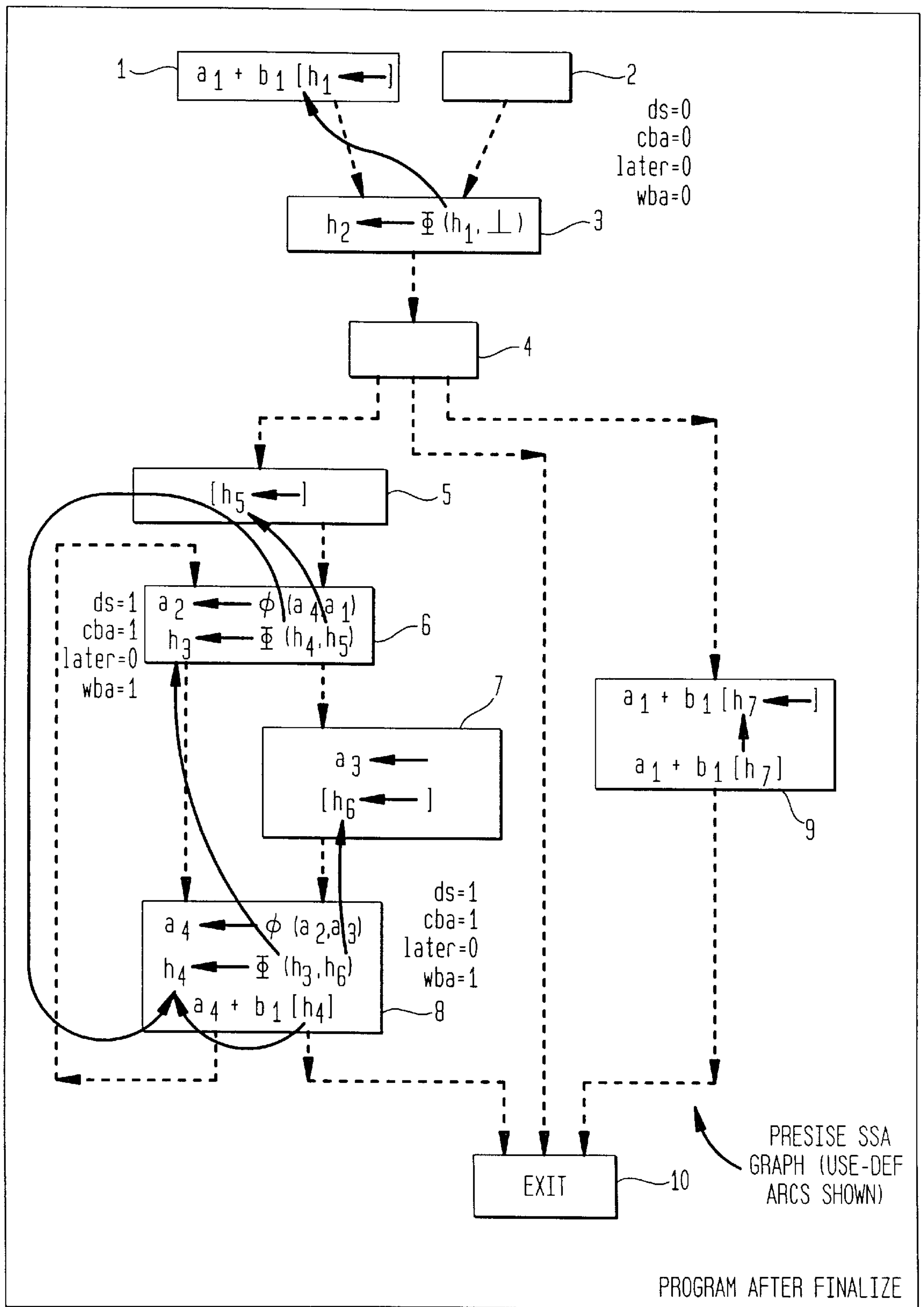

FIG. 7 shows the example program at the end of the Finalize step 922.

The correctness of the Finalize step 922 as described above is proven by the following LEMMAS and PROOFS.

LEMMA 8 (Correctness of save/reload). At the point of any reload, the temporary contains the value of the expression.

PROOF. This lemma follows directly from the Finalize algorithm 922 and from the fact that Rename assigns versions while traversing the SSA graph in dominator-tree preorder. In particular, Finalize 922 ensures directly that each reload is dominated by its available definition. Because the live ranges of different versions of h do not overlap, each reloaded occurrence must refer to its available definition.

LEMMA 9 (Optionality of reload). The optimized program does not compute the expression at any point where it is fully available.

PROOF: It is straightforward to check that the optimized program reloads the expression value for any occurrence defined by a Φ satisfying will-be-avail and it reloads the expression value for any occurrence dominated by another real occurrence of the same version. Therefore we need only note that will-be-avail accurately reflects availability in the optimized program (by Lemma 7) and that by the definition of insert we only insert for Φ operands where the insertion is required to achieve availability.

4.6 The CodeMotion Step

Once the hypothetical temporary h has been put into valid SSA form, the only remaining task is to update the SSA program representation to reflect the results of PRE. This involves introducing the real temporary t for the purpose of eliminating redundant computations. This task is performed by the optimizer 106 in the Code Motion step 926.

This task is straightforward due to the fact that h is already in valid SSA form. The SSA form of t is a subgraph of the SSA form of i, since defs of h (including Φ's) with no use are omitted.

Figure 19:
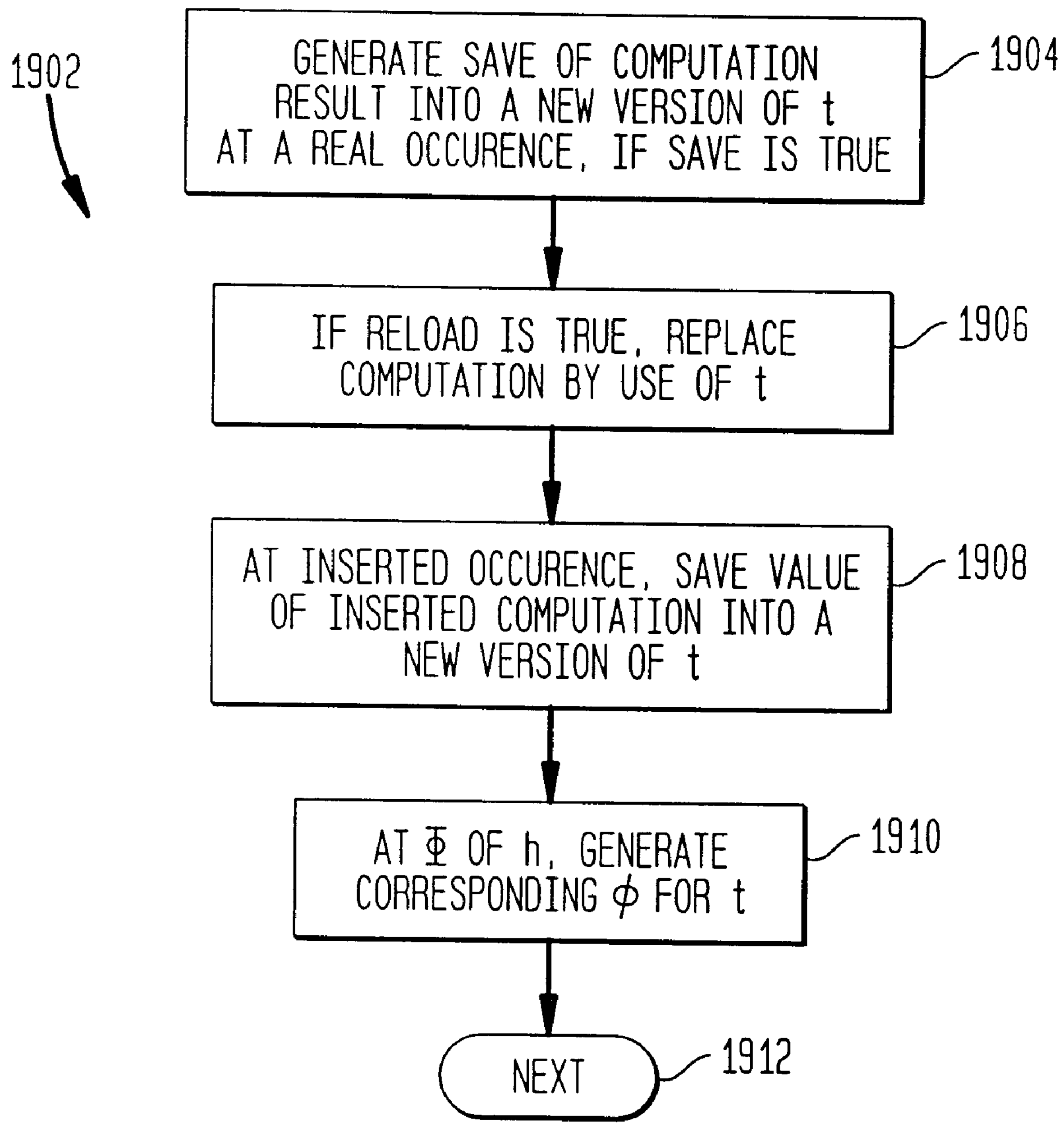
FIG. 19 is a flowchart representing the operation of a Code Motion step according to an embodiment of the invention.

The operation of the optimizer 106 when performing the Code Motion step 926 is represented by a flowchart 1902 in FIG. 19.

Figure 8:
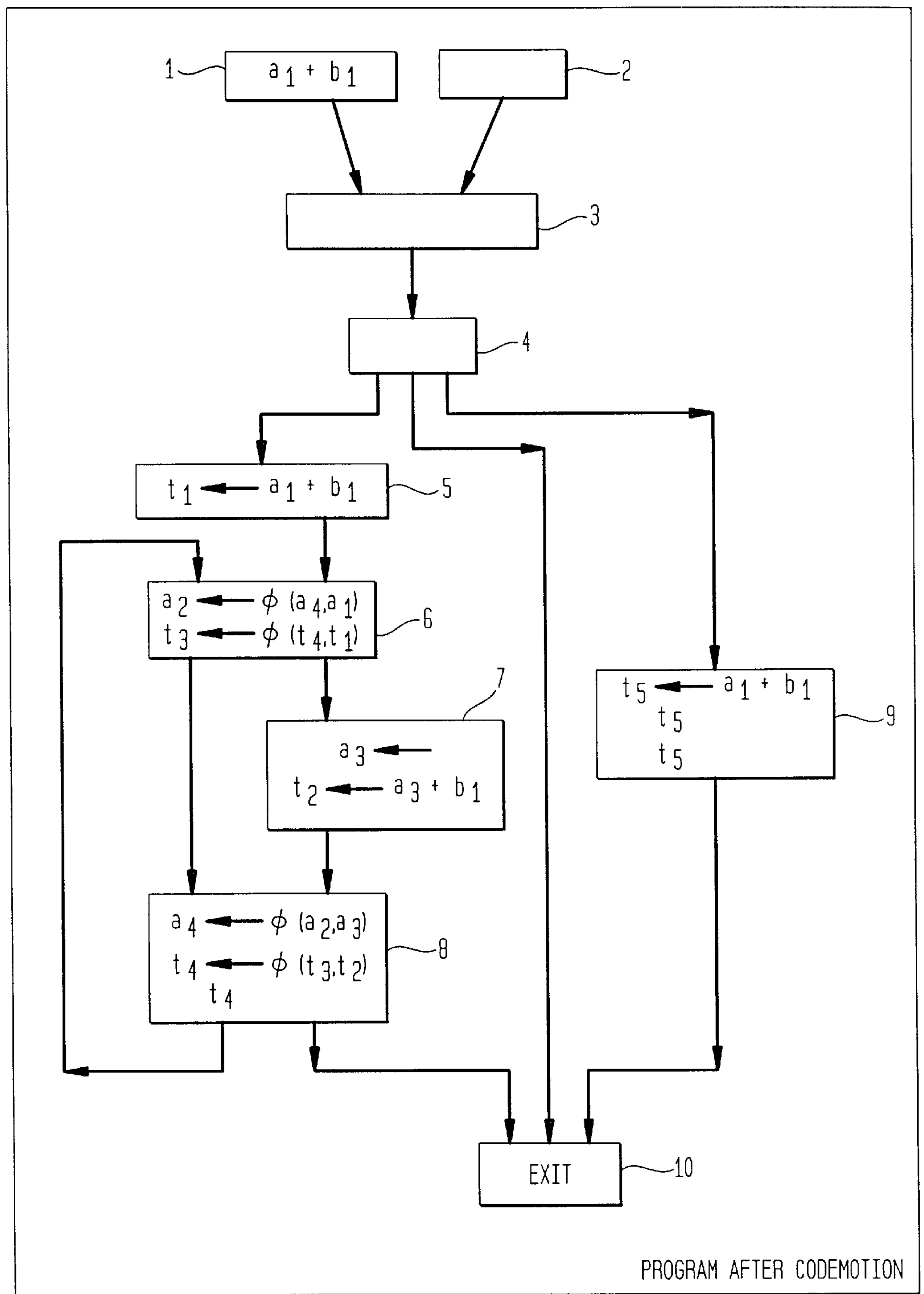

The CodeMotion step 926 walks over the SSA graph of h. At a real occurrence, if save is true, the optimizer 106 generates a save of the result of the computation into a new version of t (step 1904). If reload is true, the optimizer 106 replaces the computation by a use of t (step 1906). At an inserted occurrence, the optimizer 106 saves the value of the inserted computation into a new version of t (step 1908). At a Φ of h, the optimizer 106 generates a corresponding ( for t (step 1910). FIG. 8 shows the example program at the end of the CodeMotion step 926.

5.0 Theoretical Results

In this section, the main results about SSAPRE derived from the LEMMAS already given above are discussed.

Theorem 1. SSAPRE chooses a safe placement of computations; i.e., along any path from entry to exit exactly the same values are computed in the optimized program as in the original program.

Proof: Since insertions take place only at points satisfying down_safe, this theorem follows directly from Lemma 4.

Theorem 2. SSAPRE generates a reload of the correct expression value from temporary at a real occurrence point if and only if the expression value is available at that point in the optimized program.

Proof: This theorem follows from the fact that reloads are generated only when the reloaded occurrence is dominated by a will_be_avail Φ of the same version (in which case we refer to Lemma 7 for the availability of the expression at the reload point), or by a real occurrence of the same version that is marked save by Finalize.

Theorem 3. SSAPRE generates a save to temporary at a real occurrence or insertion point if and only if the following hold:

- the expression value is unavailable (in the optimized program) just before that point, and
- the expression value is partially anticipated just after that point (i.e., there will be a use of the saved value).

Proof: This theorem follows directly from Lemma 9 and from the fact that the Finalize algorithm 922 sets the save flag for a real occurrence only when that occurrence dominates a use of the same version by another real occurrence or by a Φ operand. In the former case the result is immediate, and in the latter case we need only refer to the fact that the expression is partially anticipated at every Φ remaining after the Rename step 914.

Theorem 4. SSAPRE chooses a computationally optimal placement; i.e., no safe placement can result in fewer computations along any path from entry to exit in the control flow graph.

Proof: We need only show that any redundancy remaining in the optimized program cannot be eliminated by any safe placement of computations. Suppose $\mathcal{P}$ is a control flow path in the optimized program leading from one computation, $\psi_1$, of the expression to another computation, $\psi_2$, of the same expression with no assignment to any operand of the expression along $\mathcal{P}$. By Theorem 2, the expression value cannot be available just before $\psi_2$, so $\psi_2$ is not dominated by a real occurrence of the same version (by Lemma 9) nor is it defined by a will_be_avail Φ (by Lemma 7). Because $\psi_1$, and $\psi_2$ do not have the same version and there is no assignment to any expression operand along $\mathcal{P}$, the definition of $\psi_2$'s version must lie on $\mathcal{P}$, and since it cannot be a real occurrence nor a will_be_avail Φ, it must be a Φ that is not will_be_avail. Such a Φ cannot satisfy later because one of its operands is reached by $\psi_1$, so it must not be down-safe. So no safe set of insertions could make $\psi_2$ available while eliminating a computation from $\mathcal{P}$.

Theorem 5. SSAPRE chooses a lifetime-optimal placement, specifically, if p is the point just after an insertion made by SSAPRE and C denotes any computationally optimal placement, C makes the expression fully available at p.

Proof: This theorem is a direct consequence of Lemma 6 and Theorem 4.

Theorem 6. SSAPRE produces minimal SSA form for the generated temporary.

Proof: This minimality result follows directly from the correctness of the dominance-frontier Φ-insertion algorithm. Each Φ remaining after the Finalize step 922 is justified by being on the iterated dominance frontier of some real or inserted occurrence that will be saved to the temporary.

6.0 Additional Embodiments

Since SSAPRE is a sparse algorithm, an implementation can reduce the maximum storage needed to optimize all the expressions in the program by finishing the work on each expression before moving on to the next one. Under this scheme, the different lexically identical expressions that need to be worked on by SSAPRE are maintained as a worklist. If the expressions in the program are represented in tree form, the invention can also exploit the nesting relationship in expression trees to reduce the overhead in the optimization of large expressions. There is also a more efficient algorithm for performing the Rename step 914 of SSAPRE. These alternate embodiments of the invention, which represent practical implementation embodiments, are described in this section.

6.1 Worklist-driven PRE

Under worklist-driven PRE, the invention includes an initial pass, Collect-Occurrences (see step 906 in FIG. 9), that scans the entire program and creates a worklist for all the expressions in the program that need to be worked on by SSAPRE. For each element of the worklist, the invention represents its occurrences in the program as a set of occurrence nodes. Each occurrence node provides enough information to pinpoint the location of the occurrence in the program. Collect-Occurrences 906 is the only pass that needs to look at the entire program. The six steps of SSAPRE (steps 912, 914, 918, 920, 922, 926) operate on each expression based only on its occurrence nodes. The intermediate storage needed to work on each expression can be reclaimed when working on the next one.

The Collect-Occurrences step 906 enters only first order expressions into the worklist. First order expressions contain only one operator. For example, in the expression (a+b)−c, a+b is the first order expression and is entered into the worklist, but (a+b)−c is not initially entered into the worklist. After SSAPRE has worked on a+b, any redundant occurrence of a+b will be replaced by a temporary t. If PRE on a+b changes (a+b)−c to t−c, the CodeMotion step 926 will enter the new first order expression t−c as a new member of the worklist. Redundant occurrences of t−c, and hence redundancies in (a+b)−c, will be replaced when t−c is processed. If the expression (a+b)−c does not yield t−c when a+b is being worked on, a+b is not redundant, implying that (a+b)−c has no redundancy and can be skipped by SSAPRE. This approach deals cleanly with the interaction between the optimizations of nested expressions and gains efficiency by ignoring the higher order expressions that exhibit no redundancy. (For higher order expressions that have redundancies, this approach also has the secondary effect of converting the expression tree essentially to triplet form.) This strategy is difficult to implement in conventional bit-vector PRE, which typically works on all expressions in the program simultaneously in order to take advantage of the parallelism inherent in bit-vector operations.

In manipulating the sparse representation of each expression, some steps in the algorithm need to visit the occurrence nodes in an order corresponding to a preorder traversal of the dominator tree of the control flow graph. For this purpose, the invention maintains the occurrence nodes for a given expression in the order of this preorder traversal of the dominator tree. As mentioned in Section 4.2, there are three kinds of occurrences. Collect-Occurrences 906 only creates the real occurrence nodes. The Φ-Insertion step 9121 inserts new occurrence nodes that represent Φ's and Φ operands. Under worklist-driven PRE, a fourth kind of occurrence nodes is required to indicate when the optimizer 106 reaches the program exits in the Rename step 914. These exit occurrence nodes can be represented just once and shared by all expressions.

6.2 Delayed Renaming

The Rename algorithm 914 described in Section 4.2 maintains version stacks for all the variables in the program in addition to the version stacks for the expressions. Apart from taking up additional storage, updating the variable stacks requires keeping track of when the values of the variables change, which may incur significant overhead. The algorithm 914 described above is not in line with sparseness, because in a sparse algorithm, the time spent in optimizing an expression should not be affected by the number of times its variables are redefined. Also, under the worklist-driven implementation of SSAPRE, it is not possible to pass over the entire program in the Rename step 914, because that would imply passing over the entire program once for every expression in the program. The solution of both of these problems is to use a more efficient algorithm for the renaming step 914 called delayed renaming.

Recall the purpose of the variable stacks in the Rename step 914 is to enable the determination of when the value of an available expression is no longer current by checking if the versions of all the variables are the same as the current versions. At a real occurrence of the expression, it is not necessary to rely on the variable stacks, because the current versions of all its variables are represented in the expression. The variable stacks are only needed when renaming Φ operands.

To implement delayed renaming, the Rename step 914 uses two separate passes. The first pass, Rename-1, is the same as Rename described above, except that it does not use any variable stack. At a Φ operand, it optimistically assumes that its version is the version on top of the expression stack. Thus, it can perform all its work based on the occurrence nodes of the expression. Rename-1 computes an initial version of the SSA graph for h that is optimistic and not entirely correct.

The correct renaming of Φ operands is delayed to the second pass, Rename-2, which relies on seeing a later real occurrence of the expression to determine the current versions of the variables. Seeing a later real occurrence implies that at the earlier Φ, the expression is partially anticipated. Thus, the versions of the Φ operands are fixed up only for these Φ's.

Rename-2 works according to a worklist built for it by Rename-1, which contains all the real occurrences that are defined by Φ's. From the versions of the variables at the merge block of a Φ, it determines the versions of the variables at each predecessor block based on the presence or absence of ϕ's for the variables at that merge block. If they are different from the versions assumed at the Φ operand in the Rename-1 pass, Rename-2 invalidates the Φ operand by resetting it to ⊥. Otherwise, the Φ operand renamed by Rename-1 is correct. If the Φ operand is also defined by Φ, it is added to the worklist so that the process can continue up the SSA graph. For example, Rename-1 will initially set the second operand of the Φ for h in block 8 of FIG. 6 to $h_3$. Rename-2 resets it to ⊥.

Table 1 specifies the rules for deciding when two occurrences should be assigned the same h-version in the absence of the variable stacks. Rules 1 and 3 are applied in Rename-1, while rules 2 and 4 are applied in Rename-2.

TABLE 1

Assigning h-versions in Delayed Renaming

| Rule | def at top of stack | current occurrence X | condition for identical h-version |
|---|---|---|---|
| 1 | real | real | all corresponding variables have |
| 2 | real | Φ operand | same versions |
| 3 | Φ | real | defs of all variables in X dominate |
| 4 | Φ | Φ operand | the Φ |

An additional advantage of delayed renaming is that it allows the invention to determine the Φ's that are not live without performing a separate dead store elimination phase. In delayed renaming, only the operands at Φ's at which the expression is partially anticipated are fixed up. The remaining Φ's correspond to dead Φ's, and they can be marked for deletion.

CONCLUSION

The SSAPRE algorithm of the invention performs PRE while taking full advantage of the SSA form in the input program and within its operation. It incorporates the advantages shared by all the other SSA-based optimization techniques: no separate phase to collect local attributes, no data flow analysis involving bit vectors, sparse representation, sparse computation of global attributes, and unified handling of each optimization's global and local forms. In actual implementation, by working on one expression at a time, the invention can also lower the maximum storage requirement needed to optimize all the expressions in the program, and also exploit the nesting relationship in expression trees to speed up the optimization of large expressions.

SSAPRE enables PRE to be seamlessly integrated into a global optimizer that uses SSA as its internal representation. Because the SSA form is updated as optimization progresses, optimizations can be re-invoked as needed without incurring the cost of repeatedly rebuilding SSA. From an engineering point of view, SSAPRE permits a cohesive software implementation by making SSA and sparseness the theme throughout the optimizer.

Previous uses of SSA were directed at problems related to variables. SSAPRE represents the first use of SSA to solve data flow problems related to expressions or operations in the program. The invention shows that data flow problems for expressions can be modeled in SSA form by introducing hypothetical temporaries that store the values of expressions. Such an approach opens up new ways to solve many data flow problems by first formulating their solution in terms of the SSA graph of the hypothetical temporary. Candidates for this new approach are code hoisting and the elimination of load and store redundancies.

The SSAPRE approach can also incorporate techniques developed in the context of classical PRE, such as the integration of strength reduction into the PRE optimization phase.

Processing expressions one at a time also allows other possibilities for SSAPRE by customizing the handling of different types of expressions. For example, one might suppress PRE for expressions that are branch conditions because the branch instructions can evaluate the conditions without extra cost. One might also move selected loop-invariant operations out of loops to points that are not down-safe because they will not raise exceptions. Since SSAPRE works bottom-up with respect to an expression tree, it can reassociate the expression tree when no optimization opportunity was found with the original form.

While various embodiments of the present invention have been described above, it should be understood that they have been presented by the way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. An optimizer for optimizing a computer program, comprising:

accessing means for accessing a static single assignment (SSA) representation of a computer program; and partial redundancy elimination (PRE) means for processing said SSA representation of said computer program to eliminate partially redundant expressions in said computer program, wherein said PRE means comprises Φ-insertion means for inserting Φ functions for expressions where different values of said expressions reach common points in said computer program, a result of each of said Φ functions being stored in a hypothetical variable h.

2. The optimizer of claim 1, wherein said hypothetical variable h is associated with each expression in said computer program.

3. The optimizer of claim 1, wherein said PRE means comprises:

renaming means for assigning a SSA version to each hypothetical variable h in said computer program.

4. The optimizer of claim 3, wherein said PRE means further comprises:

down safety means for determining whether each Φ function in said computer program is down safe; and will be available means for determining whether each expression in said computer program will be available at each Φ function associated with said each expression following eventual insertion of code into said computer program for purposes of partial redundancy elimination.

5. The optimizer of claim 4, wherein said PRE means further comprises:

finalize means for transforming said SSA representation of said computer program having hypothetical variables h to a SSA graph that includes some insertion information reflecting eventual insertions of code into said computer program for purposes of partial redundancy elimination; and code motion means for updating said SSA graph based on said insertion information to introduce real temporary variables t for said hypothetical variables h.

6. The optimizer of claim 5, wherein said PRE means further comprises:

collect occurrences means for scanning said SSA representation of said computer program to create a work list of first order expressions in said computer program that need to be considered during optimization.

7. The optimizer of claim 3, wherein said renaming means utilizes a delayed renaming approach.

8. A method for optimizing a computer program, comprising the steps of:

(1) accessing a static single assignment (SSA) representation of a computer program; and (2) processing said SSA representation of said computer program to eliminate partially redundant expressions in said computer program, wherein said processing step comprises the steps of inserting Φ functions for expressions where different values of said expressions reach common points in said computer program, a result of each of said Φ functions being stored in a hypothetical variable h.

9. The method of claim 8, wherein said hypothetical variable h is associated with each expression in said computer program.

10. The method of claim 8, wherein step (2) further comprises the steps of:

assigning a SSA version to each hypothetical variable h in said computer program.

11. The method of claim 10, wherein step (2) further comprises the steps of:

(c) determining whether each Φ function in said computer program is down safe; and (d) determining whether each expression in said computer program will be available at each Φ function associated with said each expression following eventual insertion of code into said computer program for purposes of partial redundancy elimination.

12. The method of claim 11, wherein step (2) further comprises the steps of:

(e) transforming said SSA representation of said computer program having hypothetical variables h to a SSA graph that includes some insertion information reflecting eventual insertions of code into said computer program for purposes of partial redundancy elimination; and (f) updating said SSA graph based on said insertion information to introduce real temporary variables t for said hypothetical variables h.

13. The method of claim 12, wherein step (2) further comprises the steps of:

(g) scanning said SSA representation of said computer program to create a work list of first order expressions in said computer program that need to be considered during optimization.

14. The method of claim 10, wherein step (b) utilizes a delayed renaming approach.

15. A computer program product comprising a computer useable medium having computer program logic recorded thereon, said computer program logic comprising:

accessing means for enabling a processor to access a static single assignment (SSA) representation of a computer program; and partial redundancy elimination (PRE) means for enabling the processor to process said SSA representation of said computer program to eliminate partially redundant expressions in said computer program, wherein said PRE means comprises Φ-insertion means for enabling the processor to insert Φ functions for expressions where different values of said expressions reach common points in said computer program, a result of each of said Φ functions being stored in a hypothetical variable h.

16. The computer program product of claim 15, wherein said hypothetical variable h is associated with each expression in said computer program.

17. The computer program product of claim 15, wherein said PRE means comprises:

renaming means for enabling the processor to assign a SSA version to each hypothetical variable h in said computer program.

18. The computer program product of claim 17, wherein said PRE means further comprises:

down safety means for enabling the processor to determine whether each Φ function in said computer program is down safe; and will be available means for enabling the processor to determine whether each expression in said computer program will be available at each Φ function associated with said each expression following eventual insertion of code into said computer program for purposes of partial redundancy elimination.

19. The computer program product of claim 18, wherein said PRE means further comprises:

finalize means for enabling the processor to transform said SSA representation of said computer program having hypothetical variables h to a SSA graph that includes some insertion information reflecting eventual insertions of code into said computer program for purposes of partial redundancy elimination; and code motion means for enabling the processor to update said SSA graph based on said insertion information to introduce real temporary variables t for said hypothetical variables h.

20. The computer program product of claim 19, wherein said PRE means further comprises:

collect occurrences means for enabling the processor to scan said SSA representation of said computer program to create a work list of first order expressions in said computer program that need to be considered during optimization.

21. The computer program product of claim 17, wherein said renaming means enables the processor to utilize a delayed renaming approach.

* * * * *

UNITED STATES PATENT AND TRADEMARK OFFICE

CERTIFICATE OF CORRECTION

PATENT NO. : 6,026,241

DATED : February 15, 2000

INVENTORS : Chow *et al.*

It is certified that an error appears in the above-identified patent and that said Letters Patent is hereby corrected as shown below.

In column 10, line 44, please replace "block There" with --block 1. ¶There--.

In column 26, line 59 (claim 10), please replace "steps" with --step--.

In column 26, line 60 (claim 10), please replace "assigning" with --(a) assigning--.

In column 26, line 64 (claim 11), please replace "(c)" with --(b)--.

In column 26, line 66 (claim 11), please replace "(d)" with --(c)--.

In column 27, line 6 (claim 12), please replace "(e)" with --(d)--.

In column 27, line 12 (claim 12), please replace "(f)" with --(e)--.

In column 27, line 17 (claim 13), please replace "(g)" with --(f)--.

In column 27, line 21 (claim 14), please replace "(b)" with --(a)--.

Signed and Sealed this

Tenth Day of April, 2001

*Attest:*

Nicholas P. Godici

NICHOLAS P. GODICI

*Attesting Officer* *Acting Director of the United States Patent and Trademark Office*